(12) United States Patent
Morita et al.

(10) Patent No.: US 9,706,170 B2
(45) Date of Patent: Jul. 11, 2017

(54) COMMUNICATION APPARATUS, COMMUNICATION SYSTEM, AND COMMUNICATION MANAGEMENT SYSTEM

(71) Applicants: Kenichiro Morita, Tokyo (JP); Takuya Imai, Tokyo (JP); Shoh Nagamine, Kanagawa (JP)

(72) Inventors: Kenichiro Morita, Tokyo (JP); Takuya Imai, Tokyo (JP); Shoh Nagamine, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/372,055

(22) Filed: Dec. 7, 2016

(65) Prior Publication Data

US 2017/0094225 A1  Mar. 30, 2017

Related U.S. Application Data

(63) Continuation of application No. PCT/JP2015/067101, filed on Jun. 8, 2015.

(30) Foreign Application Priority Data

Jun. 10, 2014 (JP) .................................. 2014-119529

(51) Int. Cl.
*H04N 7/14* (2006.01)
*H04N 7/15* (2006.01)
*H04L 29/06* (2006.01)

(52) U.S. Cl.
CPC ............. *H04N 7/15* (2013.01); *H04L 65/403* (2013.01); *H04N 7/147* (2013.01)

(58) Field of Classification Search
CPC combination set(s) only.
See application file for complete search history.

(56) References Cited

U.S. PATENT DOCUMENTS 5,477,542 A * 12/1995 Takahara ................ H04J 3/177
348/14.05
7,688,750 B2 * 3/2010 Chen ..................... H04L 1/0002
370/252

(Continued)

FOREIGN PATENT DOCUMENTS

JP 2006-229456 8/2006
JP 2007-036400 2/2007

(Continued)

OTHER PUBLICATIONS

International Search Report issued Sep. 1, 2015 in PCT/JP2015/067101 filed Jun. 8, 2015.

(Continued)

*Primary Examiner* — Joseph J Nguyen
(74) *Attorney, Agent, or Firm* — Oblon, McClelland, Maier & Neustadt, L.L.P.

(57) ABSTRACT

A communication apparatus outputs data received from another communication apparatus. The communication apparatus includes: a notification unit that notifies an external information processing apparatus of an output state of data received from the other communication apparatus; and a display processing unit that, while a session for receiving data with the other communication apparatus is established, acquires an output state of data transmitted to the other communication apparatus at the other communication apparatus from the information processing apparatus and displays output state information representing the acquired output state on a display device.

10 Claims, 16 Drawing Sheets

(56) References Cited

U.S. PATENT DOCUMENTS

| | | |
|---|---|---|
| 2007/0120958 A1 | 5/2007 | Sunahara |
| 2010/0098054 A1* | 4/2010 | Lu .................... H04L 12/66 370/352 |
| 2012/0086814 A1* | 4/2012 | Tsubaki ............ H04N 5/247 348/192 |
| 2013/0141515 A1* | 6/2013 | Setton ............... H04N 7/147 348/14.03 |
| 2013/0156095 A1* | 6/2013 | Li ..................... H04N 21/233 375/240.02 |
| 2013/0242034 A1 | 9/2013 | Kato et al. |
| 2014/0118475 A1 | 5/2014 | Nagamine et al. |
| 2014/0240450 A1 | 8/2014 | Morita et al. |
| 2014/0368410 A1 | 12/2014 | Imai et al. |
| 2016/0165180 A1 | 6/2016 | Kato et al. |

FOREIGN PATENT DOCUMENTS

| | | |
|---|---|---|
| JP | 2009-171120 | 7/2009 |
| JP | 4567543 | 8/2010 |
| JP | 2011-071822 | 4/2011 |
| JP | 2012-195926 | 10/2012 |
| JP | 2016-019165 A | 2/2016 |

OTHER PUBLICATIONS

Written Opinion Issued Sep. 1, 2015 in PCT/JP2015/067101 filed Jun. 8, 2015.

European Search Report issued Apr. 26, 2017 in European Application No. 15806060.8 (8 pages).

\* cited by examiner

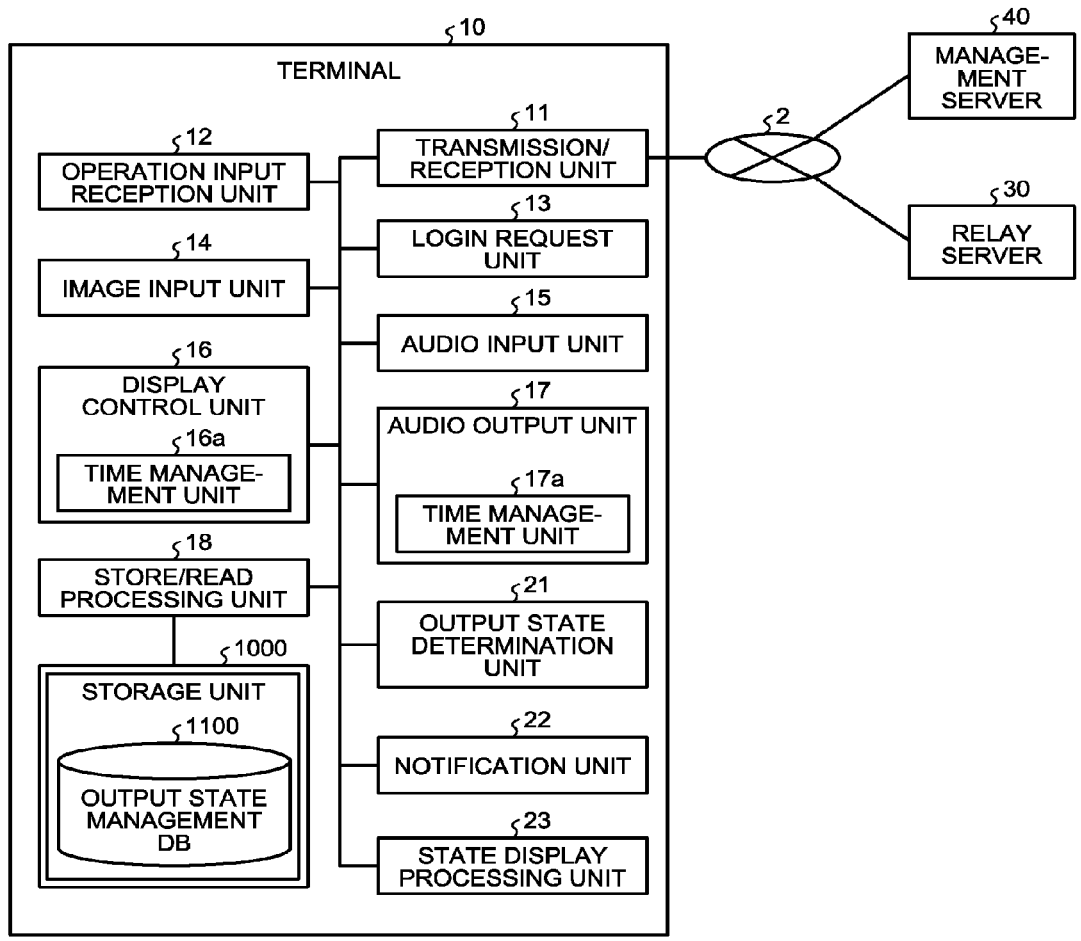

| DATA ID | ABNORMAL OUTPUT TERMINAL |
|---------|--------------------------|
| RS002   | NONE                     |
| RS003   | 1.5.5.5                  |
| RS001   | NONE                     |
| RS005   | NONE                     |
| RS010   | NONE                     |
| RS004   | NONE                     |

| TERMINAL ID | PASSWORD |
|---|---|
| 01aa | aaaa |
| 01ab | abab |
| 01ba | baba |
| ... | ... |

FIG.10

TERMINAL MANAGEMENT DB 4200

| TERMINAL ID | TERMINAL NAME | OPERATION STATUS | RECEPTION DATE | TERMINAL IP ADDRESS |
|---|---|---|---|---|
| 01aa | JP TOKYO OFFICE AA TERMINAL | ONLINE (TRANSMISSION POSSIBLE) | 2009.11.10.13:40 | 1.2.1.3 |
| 01ab | JP TOKYO OFFICE AB TERMINAL | OFFLINE | 2009.11.09.12:00 | 1.2.1.4 |
| ⋮ | ⋮ | ⋮ | ⋮ | ⋮ |
| 01ba | JP OSAKA OFFICE BA TERMINAL | ONLINE (SUSPENDED) | 2009.11.10.13:45 | 1.2.2.3 |
| 01bb | JP OSAKA OFFICE BB TERMINAL | ONLINE (TRANSMISSION POSSIBLE) | 2009.11.10.13:50 | 1.2.2.4 |
| ⋮ | ⋮ | ⋮ | ⋮ | ⋮ |
| 01ca | US NYC OFFICE CA TERMINAL | OFFLINE | 2009.11.10.12:45 | 1.3.1.3 |
| 01cb | US NYC OFFICE CB TERMINAL | ONLINE (TRANSMITTING) | 2009.11.10.13:55 | 1.3.1.4 |
| ⋮ | ⋮ | ⋮ | ⋮ | ⋮ |
| 01da | US D.C. OFFICE DA TERMINAL | ONLINE (TRANSMITTING) | 2009.11.08.12:45 | 1.3.2.3 |
| 01db | US D.C. OFFICE DB TERMINAL | ONLINE (SUSPENDED) | 2009.11.10.12:45 | 1.3.2.4 |
| ⋮ | ⋮ | ⋮ | ⋮ | ⋮ |

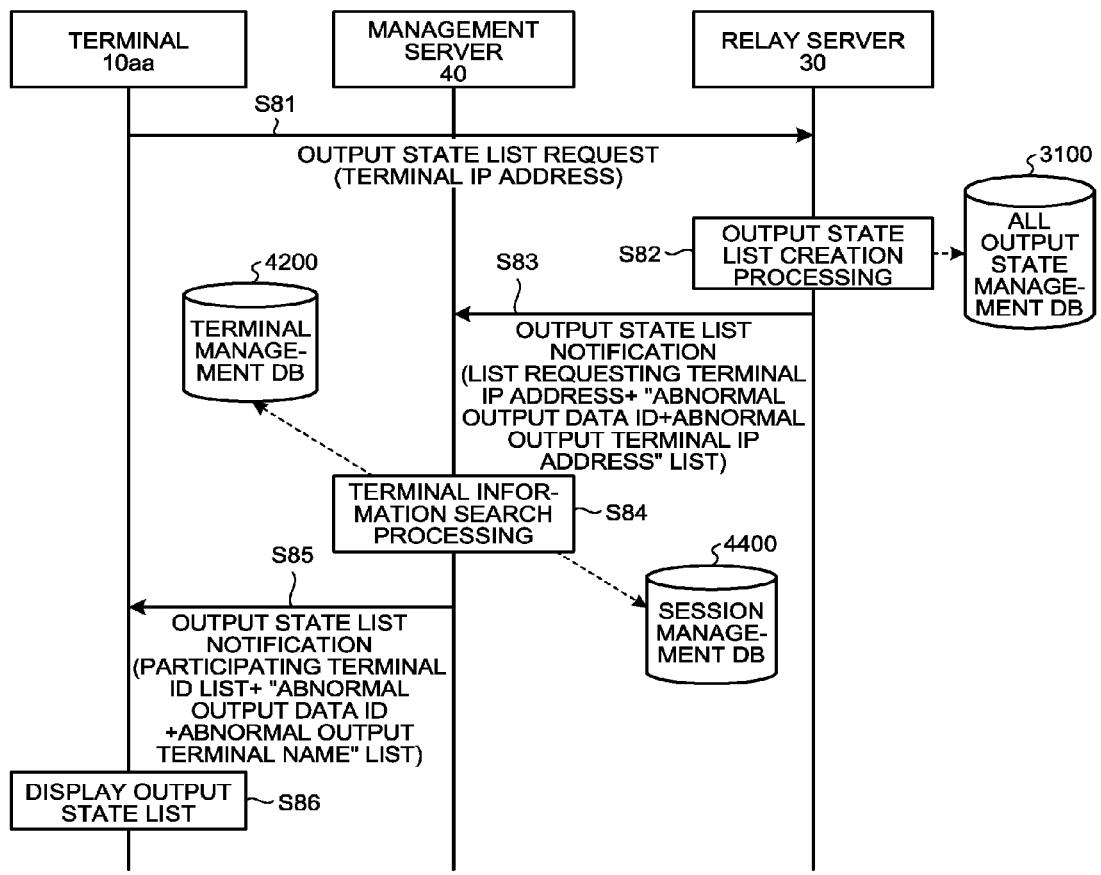

COMMUNICATION APPARATUS, COMMUNICATION SYSTEM, AND COMMUNICATION MANAGEMENT SYSTEM

CROSS-REFERENCE TO RELATED APPLICATIONS

This application is a continuation of PCT international application Ser. No. PCT/JP2015/067101 filed on Jun. 8, 2015 which designates the United States, and which claims the benefit of priority from Japanese Patent Application No. 2014-119529, filed on Jun. 10, 2014; the entire contents of which are incorporated herein by reference.

BACKGROUND OF THE INVENTION

1. Field of the Invention

The present invention relates to a communication apparatus, a communication system, and a communication management system.

2. Description of the Related Art

In a communication system, such as a television conference system that realizes a remote conference by using a communication network, it is essential to know whether the data transmitted from a local base to another base is properly output in order to realize smooth communications. From such a point of view, conventionally, is known a technology for checking in advance whether the audio of a local terminal is properly delivered to a partner terminal by using test signals. This technology however has a problem in that, because checks and adjustments before the conference are required, the conference cannot be started promptly.

On the other hand, Patent Document 1 (Japanese Laid-open Patent Publication No. 2011-71822) discloses a system in which a video image captured at a local base is synthesized with a video image being received at another base and the synthesized image is transmitted between the bases, which makes it possible to check whether the video image at the local base is properly delivered to the other base. This system makes it possible to check the state of the video image displayed at the other base during the conference.

The technique descried in Patent Document 1 however is inconvenient in that, because it is required to send back data received from another base in some way to that other base, an increase in the number of bases between which data is transmitted/received increases the network bandwidth used to take communications with the other bases. For this reason, a system that makes it possible to know the state of output of data with more simple method is required.

SUMMARY OF THE INVENTION

A communication apparatus outputs data received from another communication apparatus. The communication apparatus includes: a notification unit that notifies an external information processing apparatus of an output state of data received from the other communication apparatus; and a display processing unit that, while a session for receiving data with the other communication apparatus is established, acquires an output state of data transmitted to the other communication apparatus at the other communication apparatus from the information processing apparatus and displays output state information representing the acquired output state on a display device.

BRIEF DESCRIPTION OF THE DRAWINGS

FIG. 4 is a block diagram showing an exemplary functional configuration of a terminal.

FIG. 5 is a diagram showing an exemplary output state management table.

FIG. 10 is a diagram showing an exemplary terminal management table.

FIG. 19 is a sequence chart illustrating exemplary operations of acquiring and displaying an output state list.

FIG. 20 is a diagram showing an exemplary display of output state information.

DETAILED DESCRIPTION OF THE PREFERRED EMBODIMENTS

With reference to the accompanying drawings, an embodiment of a communication apparatus, a communication system, and a communication management system according to the present invention will be described below. As an exemplary communication system to which the invention is applied, a television conference system (also referred to as "video conference system") that realizes a remote conference between multiple bases by transmitting and receiving video data and audio data between multiple television conference terminals (corresponding to "communication devices") will be illustrated. Communication systems to which the invention can be applied are however not limited to this example. The invention is widely applicable to various communication systems that transmit and receive data between multiple communication devices and various communication terminals used in those communication systems.

Figure 1:
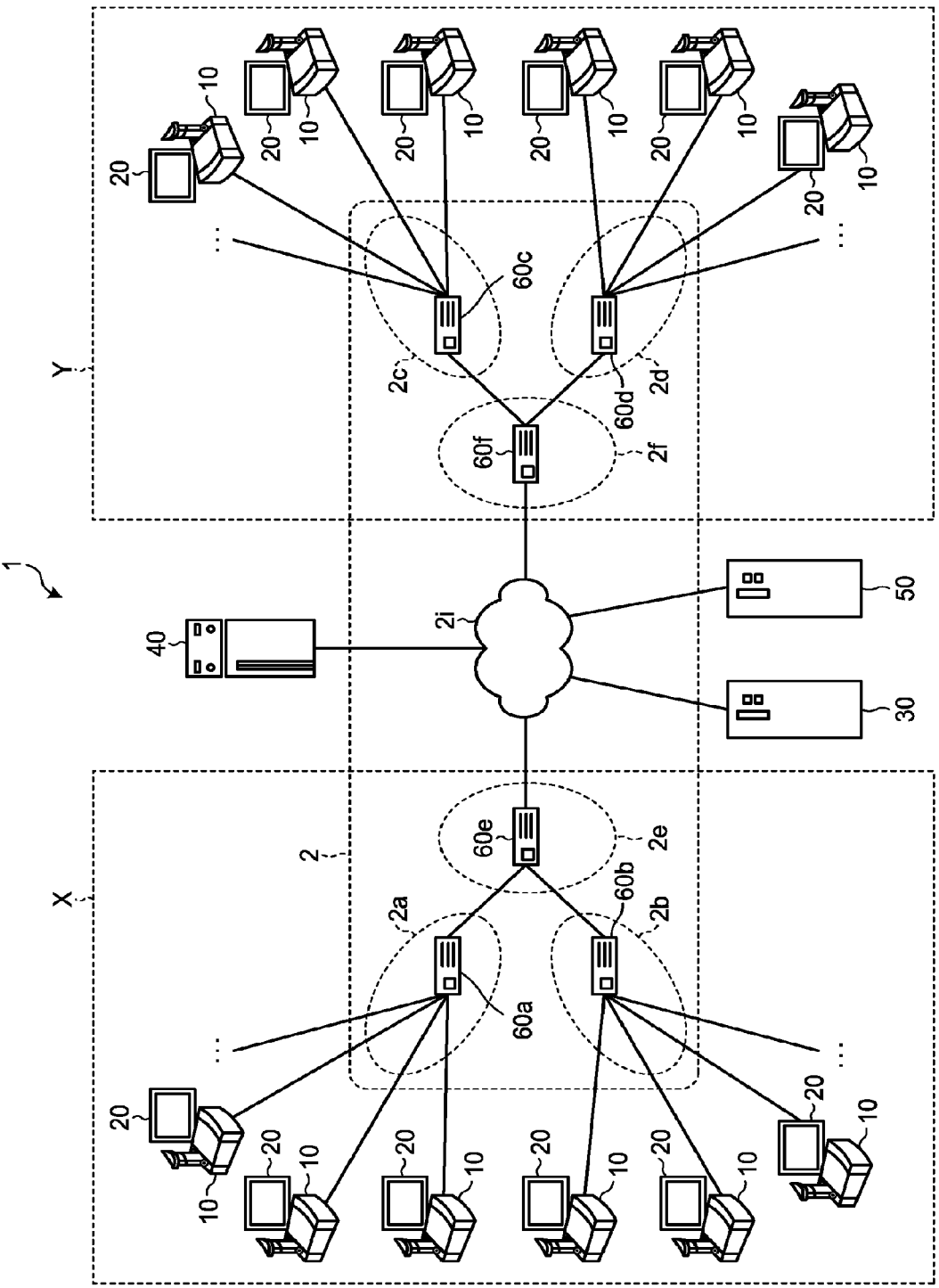
FIG. 1 is a schematic configuration diagram of a television conference system according to an embodiment.

FIG. 1 is a schematic configuration diagram of a television conference system 1 according to an embodiment. The television conference system 1 according to the embodiment includes, as shown in FIG. 1, a plurality of television conference terminals (hereinafter, simply referred to as "terminals") 10 and a plurality of displays 20 that are set at respective bases, a relay server 30, a management server 40, and a program provision server 50.

The terminal 10 transmits/receives data with other terminals 10 by using the television conference system 1 and outputs received data. The data to be dealt with includes, for example, video data on each base of the television conference, screen data of a personal computer (PC) shared between bases (that are generally referred to as "image data"), and audio data recorded at each base. The terminal 10 may be a dedicated terminal dedicated to the television conference system 1 or may be a general-purpose terminal, such as a PC, a smartphone, or a tablet terminal. By installing a terminal program to be descried later in such a general-purpose terminal, the functions of the terminal 10 are implemented as an application.

The display 20 is wired to or wirelessly connected to the terminal 10. The display 20 may be integrated with the terminal 10.

The terminal 10 is, for example, connected to a router in a local area network (LAN). The router is a network device that selects a route for data transmission. The example shown in FIG. 1 illustrates a router 60a in a LAN 2a, a router 60b in a LAN 2b, a router 60c in a LAN 2c, a router 60d in a LAN 2d, a router 60e that is connected to the router 60a and the router 60b via a dedicated line 2e and connected to the internet 2i, and a router 60f that is connected to the router 60c and the router 60d via a dedicated line 2f and connected to the Internet 2i.

It is assumed that the LAN 2a and the LAN 2b are constructed in different locations in an area X and the LAN 2c and the LAN 2d are constructed in different locations in an area Y. For example, the area X is Japan, the area Y is the United States, the LAN 2a is constructed in an office in Tokyo, the LAN 2b is constructed in an office in Osaka, the LAN 2c is constructed in an office in New York, and the LAN 2d is constructed in an office in Washington D.C. According to the embodiment, the LAN 2a, the LAN 2b, the dedicated line 2e, the Internet 2i, the dedicated line 2f, the LAN 2c, and the LAN 2d construct a communication network 2. The communication network 2 may contain a portion where, in addition to wired communications, wireless communications are performed by wireless fidelity (WiFi) or Bluetooth (trademark).

In the television conference system 1 according to the embodiment, image data and audio data are transmitted and received via the relay server 30 among multiple terminals 10. A management information session Sei for transmitting and receiving various types of management information via the management server 40 is established between the terminals 10. Furthermore, a data session Sed for transmitting and receiving video data and audio data via the relay server 30 is established between the terminals 10.

The relay server 30 is a computer that relays transmission of image data and audio data between the terminals 10. Any data transmission system can be used. For example, transmission of image data may be performed by 264/SVC or another system, such as H.264/MPEG4 AVC or H. 265.

The management server 40 is a computer that manages the whole television conference system 1 according to the embodiment. For example, the management server 40 performs authentication management and state management for each terminal 10, session management, and the like. According to the embodiment, a terminal ID that is unique identification information is given to each terminal 10. The terminal ID is not necessarily identification information unique to the terminal. It is sufficient if it is identification information used to identify the terminal that is a communications partner. For example, it may be identification information that a user inputs to the terminal. A relay server ID that is unique identification information is given to the relay server 30. A session ID is given to the data session Sed for transmitting and receiving data between the terminals 10, and a data ID is given to the data that is transmitted or received in the data session Sed. The management server 40 performs the above-described various types of management using these IDs (identification information).

The program provision server 50 is a computer that provides various programs to the terminals 10, the relay server 30, the management server 40, and the like. For example, the program provision server 50 stores a terminal program for causing the terminal 10 to implement various functions and is capable of transmitting the terminal program to the terminals 10. The program provision server 50 also stores a relay server program for causing the relay server 30 to implement various functions and is capable of transmitting the relay server program to the relay server 30. The program provision server 50 stores a management server program for causing the management server 40 to implement various functions and is capable of transmitting the management server program to the management server 40.

Figure 2:
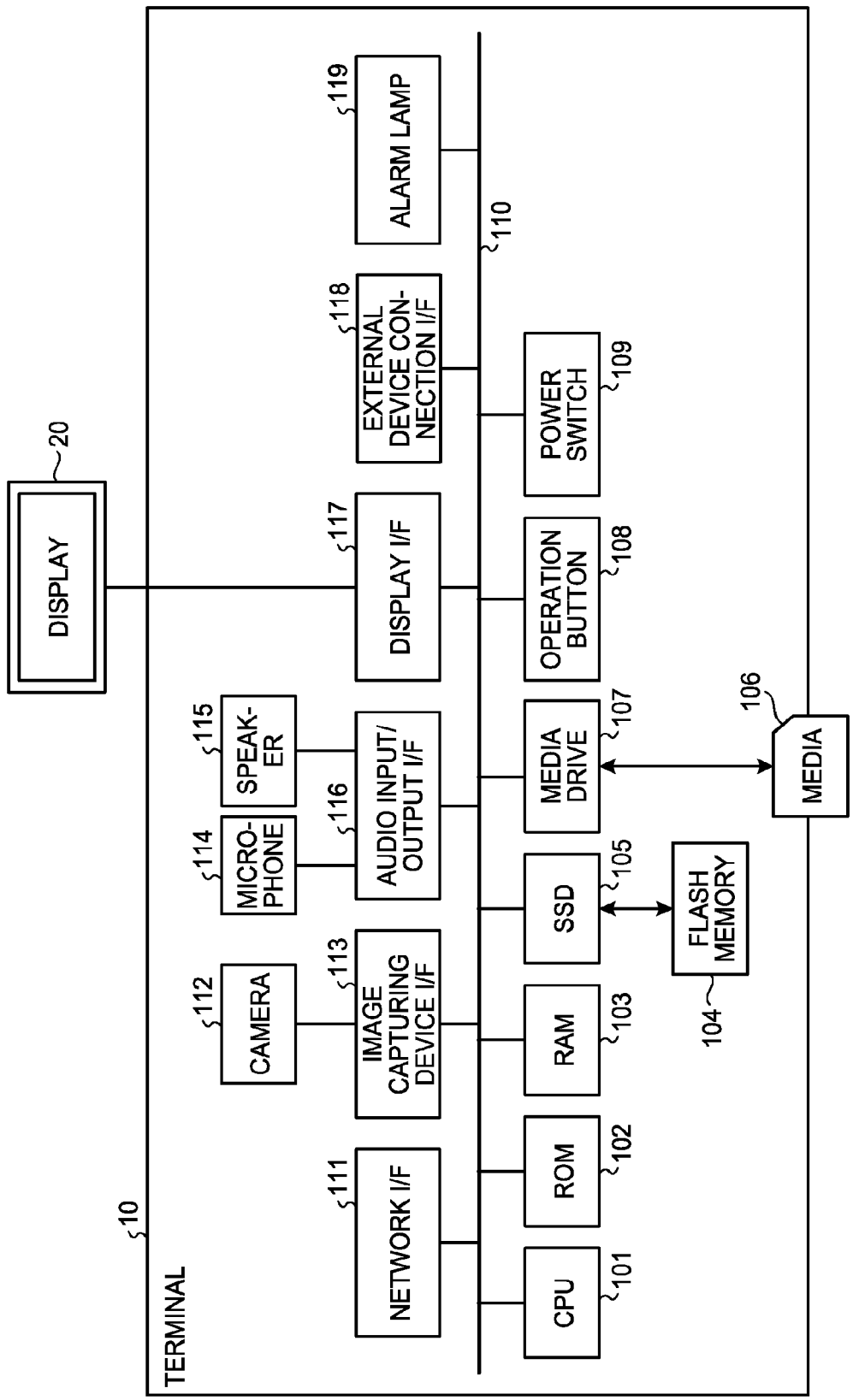
FIG. 2 is a block diagram showing an exemplary hardware configuration of a terminal.
Figure 3:
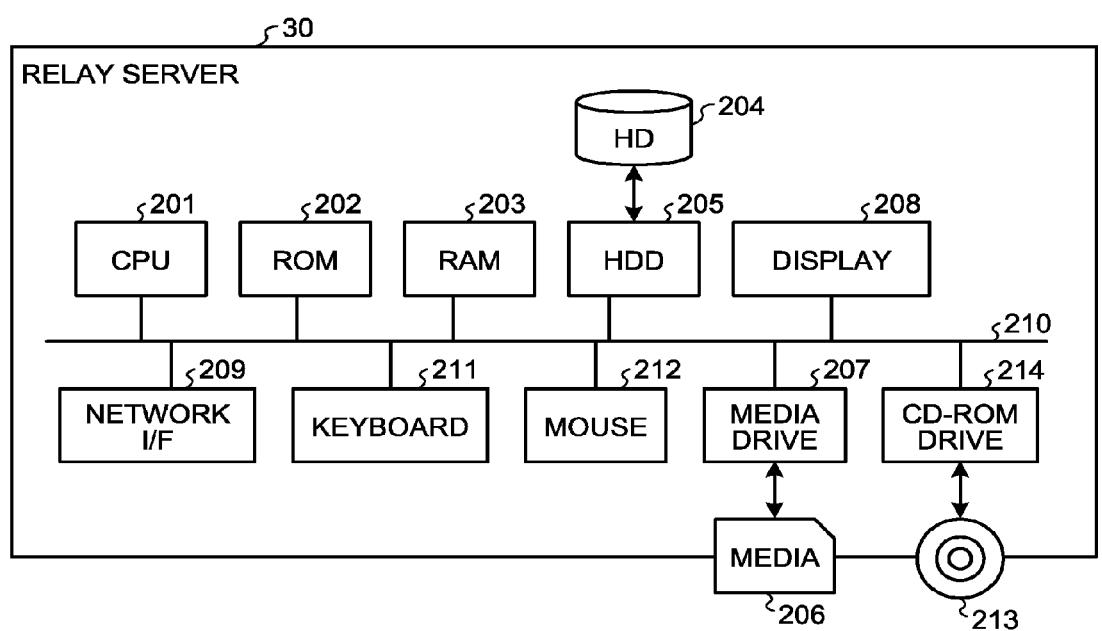
FIG. 3 is a block diagram showing an exemplary hardware configuration of a relay server.

The hardware configurations of the terminal 10, the relay server 30, and the management server 40 of the television conference system 1 according to the embodiment will be described here. FIG. 2 shows an exemplary hardware configuration of the terminal 10 and FIG. 3 shows an exemplary hardware configuration of the relay server 30. Because it is possible to apply the same hardware configuration as that of the relay server 30 to the management server 40, its hardware configuration is not shown.

As shown in FIG. 2, the terminal 10 includes a central processing unit (CPU) 101 that controls all operations of the terminal 10; a read only memory (ROM) 102 that stores a program, such as an initial program loader (IPL), used to drive the CPU 101; a random access memory (RAM) 103 used as a work area of the CPU 101; a flash memory 104 that stores the terminal program and various types of data including image data and audio data; a solid state drive (SSD) 105 that controls read/write of various types of data from/in the flash memory 104 according to the control by the CPU 101; a media drive 107 that controls read/write (store) of data from/in a recording medium 106, such as a flash memory; an operation button 108 that is operated to, for example, select another terminal 10 serving as a communication partner; a power switch 109 for switching on/off of the power of the terminal 10; and a network interface (I/F) 111 that transmits data by using the communication network 2.

The terminal 10 further includes a built-in camera 112 that acquires image data by capturing an image of a subject according to the control by the CPU 101; an image capturing device I/F 113 that controls driving of the camera 112; a built-in microphone 114 that inputs audio; a built-in speaker 115 that outputs audio; an audio input/output I/F 116 that processes input/output of audio signals from/to the microphone 114 and the speaker 115 according to the control by the CPU 101; a display I/F 117 that transmits image data to be displayed on the display 20 according to the control by the CPU 101; an external device connection I/F 118 for connecting various external devices; an alarm lamp 119 that makes a notification indicating abnormality in various functions of the terminal 10; and a bus line 110, such as an address bus or a data bus, for electrically connecting the above-described components.

The camera 112, the microphone 114, and the speaker 115 are not necessarily built in the terminal 10, and they may be configured to be externally connected. The display 20 may be configured to be built in the terminal 10. A display device, such as a liquid crystal panel, is assumed as the display 20, but the display 20 is not limited to this. The display 20 may be a projection device, such as a projector. The hardware configuration of the terminal 10 shown in FIG. 2 is an example only, and hardware other than the above-described hardware may be added.

The terminal program provided by the program provision server 50 is stored in, for example, the flash memory 104, is read into the RAM 103 according to the control by the CPU 101, and is executed. It is sufficient if the memory that stores the terminal program is a non-volatile flash memory. In place of the flash memory 104, an electrically erasable and programmable ROM (EEPROM), or the like, may be used. The terminal program may be recorded as a file in an installable or executable form in a computer-readable recording medium, such as the recording medium 106, and provided. The terminal program may be provided as a built-in program that is stored in advance in, for example, the ROM 102.

As shown in FIG. 3, the relay server 30 includes a CPU 201 that controls all operations of the relay server 30; a ROM 202 that stores a program, such as an IPL, used to drive the CPU 201; a RAM 203 that is used as a work area of the CPU 201; a hard disk (HD) 204 that stores various types of data including the relay server program; a hard disk drive (HDD) 205 that controls read/write of various types of data from/in the HD 204; a media drive 207 that controls read/write (store) of data from/in a recording medium 206, such as a flash memory; a display 208 that displays various types of information; a network I/F 209 for transmitting data by using the communication network 2; a keyboard 211; a mouse 212; a CD-ROM drive 214 that controls read/write of various types of data from/in a compact disk read only memory (CD-ROM) 213 that is an exemplary removable recording medium; and a bus line 210, such as an address bus or data bus, for electrically connecting the above-described components.

The relay server program provided by the program provision server 50 is stored in, for example, the HD 204, is read into the RAM 203 according to the control by the CPU 201, and is executed. The relay server program may be recorded as a file in an installable or executable form in a computer-readable recording medium, such as the recording medium 206 or the CD-ROM 213, and provided. The management server program may be provided as a built-in program that is stored in advance in, for example, the ROM 202.

Exemplary removable recording media include a computer-readable recording medium, such as a compact disk recordable (CD-R), a digital versatile disk (DVD), and a Blue-ray disc. The above-described various programs may be recorded in such a recording medium and provided.

The functional configuration of the terminal 10 will be described here. FIG. 4 is a block diagram showing an exemplary functional configuration of the terminal 10, and FIG. 5 is a diagram showing an exemplary output state management table held by the terminal 10.

As shown in FIG. 4, the terminal 10 includes a transmission/reception unit 11, an operation input reception unit 12, a login request unit 13, an image input unit 14, an audio input unit 15, a display control unit 16, an audio output unit 17, a store/read processing unit 18, an output state determination unit 21, a notification unit 22, and a state display processing unit 23. These units are the functions implemented by the CPU 101 by executing the terminal program that is loaded from, for example, the flash memory 104 shown in FIG. 2 into the RAM 103. The terminal 10 further includes a storage unit 1000 consisting of, for example, the RAM 103 and the flash memory 104 shown in FIG. 2.

The storage unit 1000 stores the terminal ID for identifying the terminal 10, the password, and the like. The storage unit 1000 is used as a reception buffer for receiving image data and audio data received when a television conference is carried out with another terminal 10.

In the storage unit 1000, an output state management DB 1100 with the output state management table shown in FIG. 5 is also constructed. In the output state management table, a list of data shared with other terminals 10 in the conference in which the terminal 10 is currently participating is managed. For example, in the output state management table, a data ID for identifying data, the last output time, and the current output state are managed in association with one another for each data shared with other terminals 10.

The last output time represents the time at which the terminal 10 output the data last time. For example, in the case of image data, the last output time refers to the time at which the display control unit 16 performed processing of displaying the image data on the display 20 last time and, in the case of audio data, the last output time refers to the time at which the audio output unit 17 performed processing for outputting the audio to reproduce the audio from the speaker 115 last time. As for the time, it is sufficient if the system time counted in the terminal 10 is used.

The current output state represents the current state of output of the data by the terminal 10. The current state represents, about the data, whether the terminal 10 can normally perform output processing (normal output), the terminal 10 is in an abnormal state where the terminal 10 is trying to output the data but cannot properly perform the output processing due to some reason (abnormal output), or the terminal 10 does not output the data is chosen (output stopped). The normal state here refers to the state where the output of the data does not stagnate and the abnormal state refers to the state where the output of the data stagnates for a given period time or more.

The transmission/reception unit 11 transmits and receives various types of data to and from the relay server 30 and the management server 40 via the communication network 2. The transmission/reception unit 11 is realized with, for example, the network I/F 111 and the CPU 101 shown in FIG. 2.

The operation input reception unit 12 receives various types of input operations by a user who uses the terminal 10. The operation input reception unit 12 is realized with, for example, the operation button 108 and the power switch 109 shown in FIG. 2.

The login request unit 13 transmits login request information and the IP address of the local terminal from the transmission/reception unit 11 to the management server 40 via the communication network 2 in response to an on operation on the power switch 109. The login request unit 13 is realized with the CPU 101 shown in FIG. 2.

The image input unit 14 inputs image data, such as video data of the local base that is captured by the camera 112 and/or image data, such as the screen data of the PC shared with other terminals 10. The image input unit 14 is realized with, for example, the image capturing device I/F 113, the external device connection I/F 118, and the CPU 101 shown in FIG. 2.

The audio input unit 15 inputs audio data of the local base acquired by using the microphone 114. The audio input unit 15 is realized with, for example, the audio input/output I/F 116 and the CPU 101 shown in FIG. 2.

The display control unit 16 performs drawing processing and/or the like for displaying the image data received by the transmission/reception unit 11 as a television conference screen and passes the processed data to the display 20 to cause the display 20 to display the television conference screen. When the state display processing unit 23 to be described later issues an output state information display request, the display control unit 16 performs control to display the output state information on the display 20. The display control unit 16 is realized with, for example, the CPU 101 and the display I/F 117 shown in FIG. 2.

The display control unit 16 has a function of a time management unit 16a. Each time processing for displaying data on the display 20 is performed about each image data received by the transmission/reception unit 11, the time management unit 16a performs processing of writing the time (system time) in the above-described output state management table as the last output time.

The audio output unit 17 performs processing of outputting data of the audio data received by the transmission/reception unit 11 to reproduce the data from the speaker 115. The audio output unit 17 is realized with, for example, the audio input/output I/F 116 and the CPU 101.

The audio output unit 17 has a function of a time management unit 17a. Each time the processing of outputting data to reproduce the data from the speaker 115 is performed about each audio data received by the transmission/reception unit 11, the time management unit 17a performs processing of writing the time (system time) in the above-described output state management table as the last output time.

The store/read processing unit 18 performs processing of storing various types of data in the storage unit 1000 and reads various types of data from the storage unit 1000. The store/read processing unit 18 is realized with, for example, the SSD 105 and the CPU 101 shown in FIG. 2.

As for each image data and audio data that the terminal 10 is outputting, the output state determination unit 21 checks the above-described last output time in the output state management table and determines the output state. The notification unit 22 performs processing of notifying the relay server 30 of the output state that is determined by the output state determination unit 21. For example, when the output state determination unit 21 detects data in an abnormal output state, the notification unit 22 performs processing of notifying the relay server 30 thereof. When the output state determination unit 21 detects data that has recovered from an abnormal output state to a normal output state, the notification unit 22 performs processing of notifying the relay server 30 thereof. Specific examples of the processing performed by the output state determination unit 21 and the notification unit 22 will be described in detail later. The output state determination unit 21 is realized with, for example, the CPU 101 shown in FIG. 2. The notification unit 22 is realized with, for example, the network I/F 111 and the CPU 101.

The state display processing unit 23 performs processing for displaying, on the display 20, output state information representing the output state, at the other terminal 10, of the data that the terminal 10 is transmitting to another terminal 10. For example, upon receiving an abnormal output notification indicating that the image data or audio data is in an abnormal output state, the state display processing unit 23 generates output state information representing that there is an abnormality at the other terminal 10. Upon receiving an abnormal output recovery notification indicating that image data or audio data that was in an abnormal output state has recovered at the other terminal 10, the state display processing unit 23 generates output state information representing that there is a recovery from an abnormal output at the other terminal 10. The state display processing unit 23 passes such output state information to the display control unit 16 and issues an output state information display request to display the output state information on the display 20 as, for example, a pop-up screen on the television conference screen (see FIGS. 18A and 18B).

In response to, for example, an operation on the operation button 108 by the user, the state display processing unit 23 requests a list of output states, at other terminals 10, of respective data that the terminal 10 is transmitting to those other terminals. Upon receiving the output state list provided in response to the request from the relay server 30 via the management server 40, the state display processing unit 23 generates, using that data, output state information representing the list of the output states at the terminals at the respective bases participating in the television conference. The state display processing unit 23 passes the output state information to the display control unit 16 and issues an output state information display request to display the output state information as a participating base list screen on the display 20 (see FIG. 20).

Figure 6:
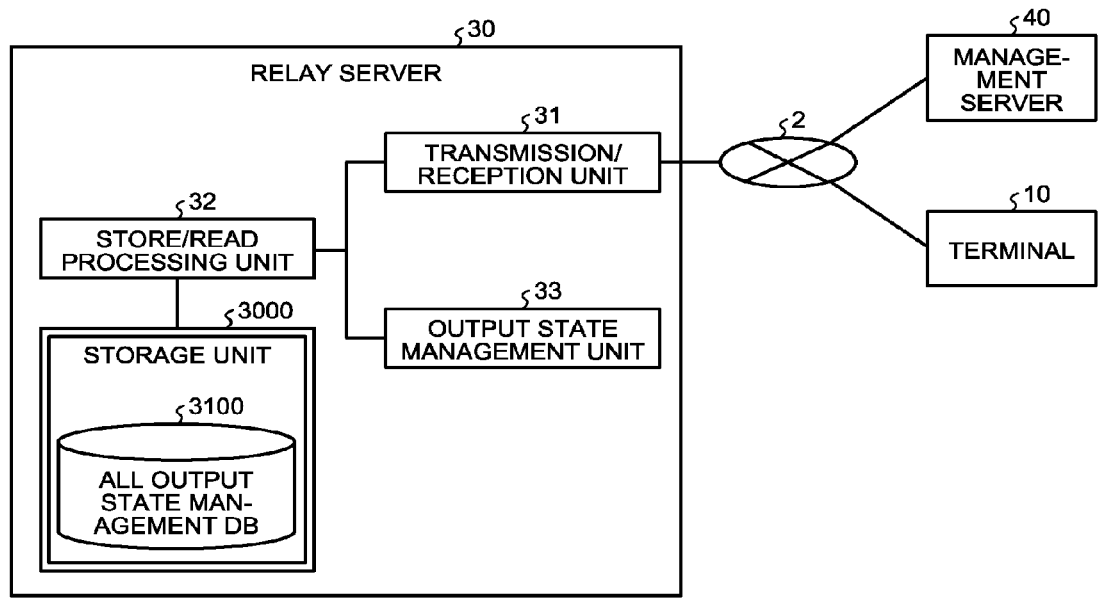
FIG. 6 is a block diagram illustrating an exemplary functional configuration of a relay server.
Figure 7:
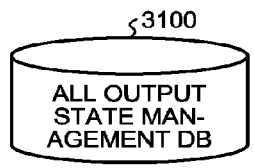
FIG. 7 is a diagram showing an exemplary all output state management table.

The functional configuration of the relay server 30 will be described here. FIG. 6 is a block diagram illustrating a functional configuration of the relay server 30. FIG. 7 is a diagram showing an exemplary all output state management table held by the relay server 30.

As shown in FIG. 6, the relay server 30 includes a transmission/reception unit 31, a store/read processing unit 32, and an output state management unit 33. These units are, for example, the functions implemented by the CPU 201 by executing the relay server program that is loaded from the HD 204 shown in FIG. 3 into the RAM 203. The relay server 30 further includes a storage unit 3000 consisting of, for example, the HD 204 shown in FIG. 2.

In the storage unit 3000, an all output state management DB 3100 including the all output state management table shown in FIG. 7 is also constructed. In the all output state management table, a list of output states of all data relayed by the relay server 30 is managed. For example, in the all output state management table, as for each data relayed by the relay server 30, the data ID for identifying the data and the IP address of the terminal 10 (abnormal output terminal) at which data is in an abnormal output state are managed in association with each other.

The transmission/reception unit 31 transmits/receives various types of data to/from the respective terminals 10 and the management server 40 via the communication network 2. The transmission/reception unit 31 is realized with, for example, the network I/F 209 and the CPU 201 shown in FIG. 3.

The store/read processing unit 32 performs processing of storing/reading various types of data in/from the storage unit 3000. The store/read processing unit 32 is realized with, for example, the HDD 205 and the CPU 201 shown in FIG. 3.

Using the above-described all output state management table, the output state management unit 33 manages the output states of all data that the relay server 30 relays. Specifically, upon receiving, from each terminal 10, a notification indicating that certain data is in an abnormal output state or a notification indicating that certain data has recovered from an abnormal output state to a normal output state, the output state management unit 33 corrects the all output state management table according to the received notification and takes management to know in which data output an abnormality occurs and at which terminal 10 it occurs.

Upon receiving an abnormal output notification from a terminal 10, the output state management unit 33 notifies the management server 40 of the abnormal output information to which the IP address of the terminal 10 from which the data in the abnormal output state is transmitted is added in order to cause the transmitting terminal 10 to perform processing of displaying the output state information. Furthermore, upon receiving an output state list request from a terminal 10, the output state management unit 33 creates an output state list using the above-described all output state management table and passes the output state list to which the IP address of the terminal 10 requesting the output state list is added, to the management server 40 in order to cause the terminal 10 to perform processing of displaying the output state information.

Figure 8:
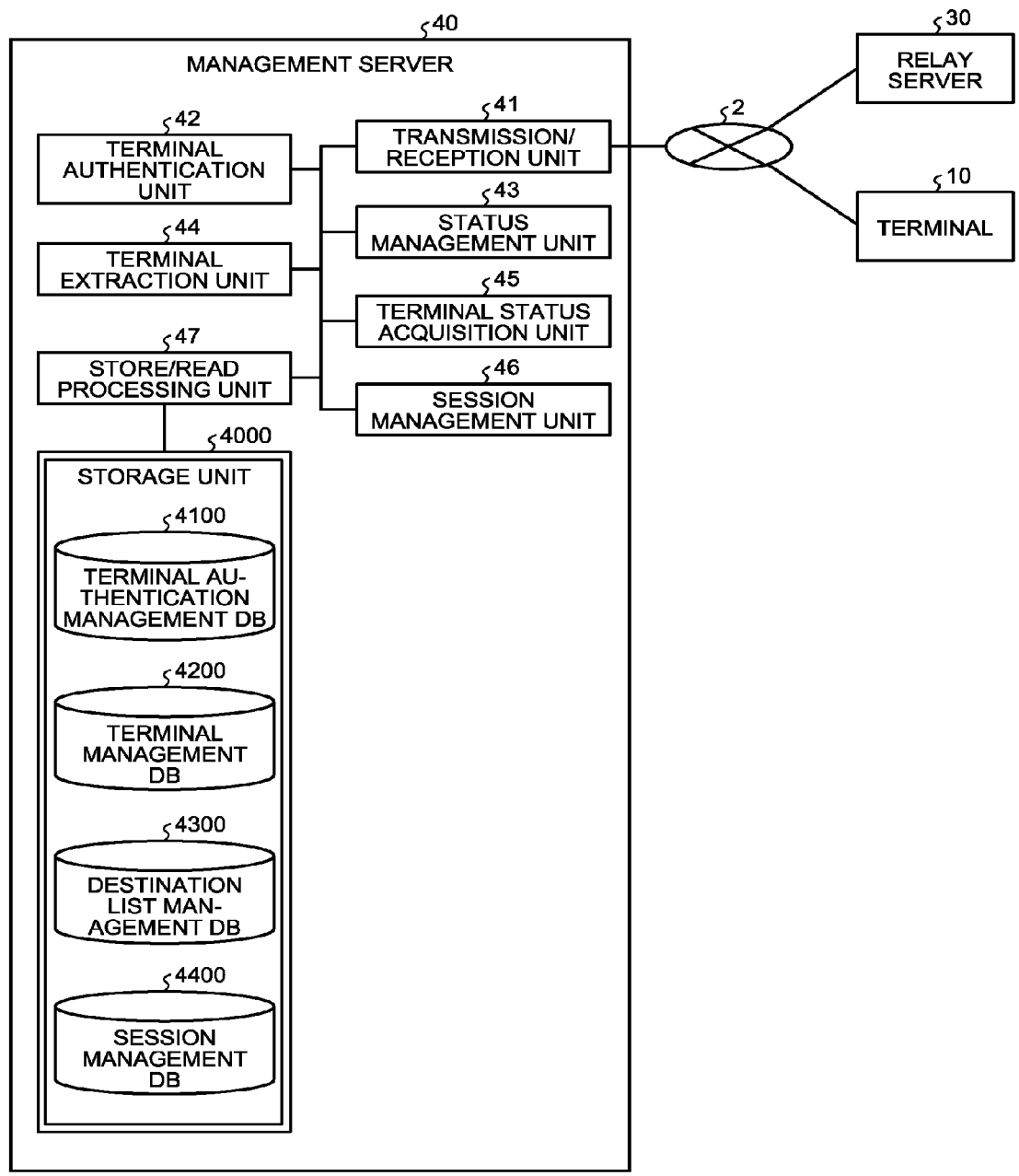
FIG. 8 is a block diagram showing an exemplary functional configuration of a management server.

The functional configuration of the management server 40 will be described here. FIG. 8 is a block diagram showing an exemplary functional configuration of the management server 40. FIGS. 9 to 12 are diagrams showing an exemplary terminal authentication management table, an exemplary terminal management table, an exemplary destination list management table, and an exemplary session management table, respectively, held by the management server 40.

As shown in FIG. 8, the management server 40 includes a transmission/reception unit 41, a terminal authentication unit 42, a status management unit 43, a terminal extraction unit 44, a terminal status acquisition unit 45, a session management unit 46, and a store/read processing unit 47. These units are the functions implemented by the CPU 201 by executing the management server program that is loaded from, for example, the HD 204 shown in FIG. 3 into the RAM 203. The management server 40 further includes a storage unit 4000 consisting of, for example, the HD 204 shown in FIG. 3.

Figure 9:
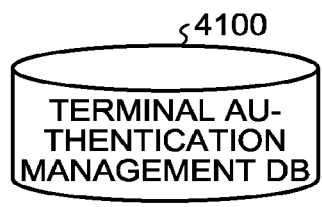
FIG. 9 is a diagram showing an exemplary terminal authentication management table.

In the storage unit 4000, a terminal authentication management DB 4100 including the terminal authentication management table shown in FIG. 9 is constructed. In the terminal authentication management table, the terminal IDs of all terminals 10 managed by the management server 40 are managed in association with passwords. For example, the terminal authentication management table shown in FIG. 9 represents that the password of the terminal 10 with the terminal ID of "01aa" is "aaaa".

In the storage unit 4000, a terminal management DB 4200 including the terminal management table shown in FIG. 10 is also constructed. In the terminal management table, the terminal ID of each terminal 10 is managed in association with the display name of each terminal 10 (hereinafter, "terminal name"), the operation status of each terminal 10, the date at which a login request information for logging in the television conference system 1 was received by the management server 40, and the IP address of each terminal 10.

For example, the terminal management table shown in FIG. 10 represents that the terminal name of the terminal 10 with the terminal ID of "01aa" is "JP Tokyo Office AA terminal", the operation status is "On-line (transmission possible)", the date at which login request information is received is "2009,11.10.13:40", and the IP address is "1.2.1.3".

The terminal IDs in the terminal management table are, for example, allocated uniquely when the terminals 10 are registered in the television conference system 1. The terminal names are registered or changed by the management unit of the management server 40. The terminal names may be registered or changed according to a request issued from the terminal 10 to the management server 40.

The operation status of "On-line (transmission possible)" represents that the terminal 10 has been logged in the television conference system 1 but is not participating in the television conference, the operation status of "On-line (transmitting)" represents that the terminal 10 has been logged in the television conference system 1 and is participating in the television conference system 1, and the operation status of "Off-line" represents that the terminal 10 has not logged in the television conference system 1.

Figure 11:
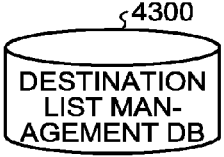
FIG. 11 is a diagram showing an exemplary destination list management table.

In the storage unit 4000, a destination list management DB 4300 including the destination list management table shown in FIG. 11 is also constructed. In the destination list management table, with the terminal ID of the terminal (requesting terminal) issuing a request for starting a television conference, all the terminal IDs of terminals 10 registered as candidates of other terminals (destination terminals) to participate in the television conference are managed in association.

For example, the destination list management table shown in FIG. 11 represents that, in a case where the terminal 10 with the terminal ID of "01ab" issues a request for starting a television conference, destination terminal candidates are the terminal 10 with the terminal ID of "01aa", the terminal 10 with the terminal ID of "01ca", and the terminal 10 with the terminal ID of "01cb". The destination terminal candidates are added to or deleted in response to a request issued from the terminal 10 to the management server 40.

Figure 12:
FIG. 12 is a diagram showing an exemplary session management table.

In the storage unit 4000, a session management DB 4400 including the session management table shown in FIG. 12 is also constructed. In the session management table, each session ID allocated to each data session Sed in which data is transmitted and received is managed in association with a relay server ID that identifies the relay server 30 to be used to relay data, a terminal ID of a requesting terminal, a terminal ID of a destination terminal, and a data ID that identifies data transmitted/received in the data session Sed.

For example, the session management table shown in FIG. 12 represents that, in the data session Sed with the session ID of "se1", the data with the data ID of "RS100" and the data with the data ID of "RS101" are transmitted and received between the requesting terminal with the terminal ID of "01aa" and the destination terminal with the terminal ID of "01db" via the relay server 30 with the relay server ID of "111a".

The transmission/reception unit 41 transmits and receives various types of data to and from the respective terminals 10 and the relay server 30 via the communication network 2. The transmission/reception unit 41 is realized with, for example, the network I/F 209 and the CPU 201 shown in FIG. 3.

The terminal authentication unit 42 performs terminal authentication by searching the terminal authentication management DB 4100 using, as search keys, the terminal ID and the password contained in a login request information from a terminal 10 that is received via the transmission/reception unit 41 and by determining whether the same terminal ID and password are managed in the terminal authentication management DB 4100. The terminal authentication unit 42 is realized with, for example, the CPU 201 shown in FIG. 3.

In order to manage the operation status of the terminal 10 that has transmit the login request information, the status management unit 43 stores, in the terminal management DB

4200 of the storage unit 4000, the terminal ID of the terminal 10 in association with the operation status, the date at which the login request information was received by the management server 40, and the IP address. Furthermore, based on the power off state information transmitted from the terminal 10 in response to switching off the power switch 109 of the terminal 10 from the on state, the status management unit 43 changes the operation status of the terminal 10 in the terminal management DB 4200 from on-line to off-line. The status management unit 43 is realized with, for example, the CPU 201 shown in FIG. 3.

Using, as a search key, the terminal ID of the terminal 10 that has transmitted the login-request information, the terminal extraction unit 44 searches the destination list management DB 4300 of the storage unit 4000 and extracts the terminal IDs of terminals 10 that are destination terminal candidates in a case where the terminal 10 is the requesting terminal. Furthermore, using, as a search key, the terminal ID of the terminal 10 that has transmitted the login-request information, the terminal extraction unit 44 searches the destination list management DB 4300 and extracts the terminal IDs of other terminals 10 for which the terminal ID of the terminal 10 is registered as a destination terminal candidate. The terminal extraction unit 44 is realized with, for example, the CPU 201 shown in FIG. 3.

Using, as search keys, the terminal IDs extracted by the terminal extraction unit 44, the terminal status acquisition unit 45 searches the terminal management DB 4200 of the storage unit 4000 and reads the operation status of each detected terminal ID. Accordingly, the terminal status acquisition unit 45 can acquire the operation statuses of all terminals 10 that are destination terminal candidates corresponding to the terminal 10 that has transmitted the login request information. Furthermore, using, as a search key, the terminal ID of the terminal 10 that has transmitted the login request information, the terminal status acquisition unit 45 searches the terminal management DB 4200 and acquires the operation status of the terminal 10. The terminal status acquisition unit 45 is realized with, for example, the CPU 201 shown in FIG. 3.

Upon establishing the data session Sed between terminals 10 via the relay server 30, the session management unit 46 allocates a session ID to the data session Sed. The session management unit 46 stores, in the session management DB 4400 of the storage unit 4000, the terminal ID of the requesting terminal, the terminal ID of the destination terminal, and the data ID of the transmitted/received data in association with the session ID. The session management unit 46 is realized using, for example, the CPU 201 shown in FIG. 3.

Figure 13:
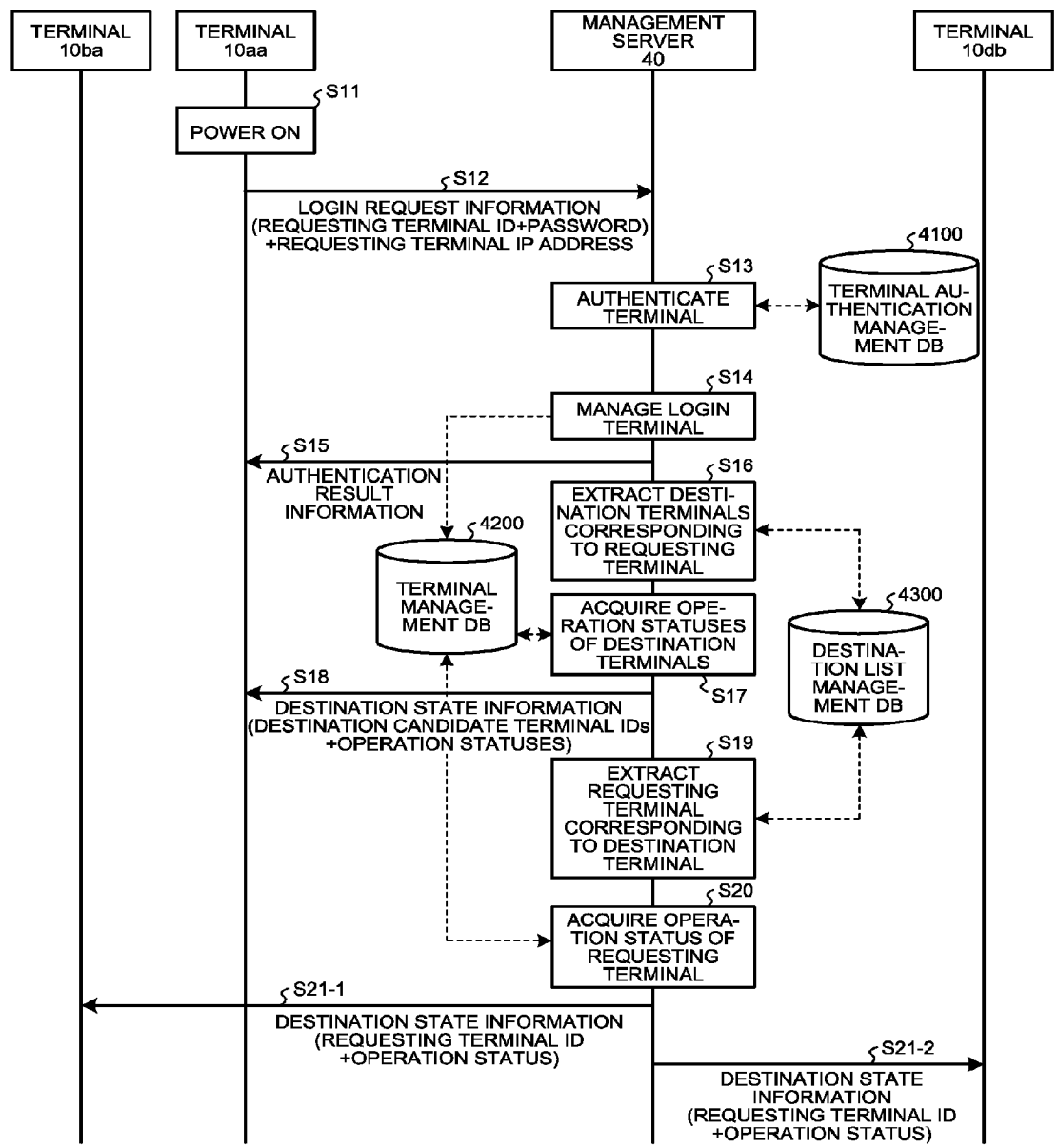
FIG. 13 is a sequence chart illustrating exemplary preliminary operations.

Operations of the television conference system 1 according to the embodiment will be described here. FIG. 13 is a sequence chart illustrating exemplary preliminary operations until a terminal 10 enters a preliminary state for participating in a television conference. FIG. 13 illustrates an example where a terminal 10aa is a requesting terminal, a terminal 10ba and a terminal 10db are destination terminals, and the terminal 10aa that is a requesting terminal enters a preliminary state. In the preliminary operations, various types of information are transmitted and received in the management information session Sei among the terminals 10aa, 10ba, and 10db and the management server 40.

First, in response to an operation on the power switch 109 of the terminal 10aa, the power of the terminal 10aa is turned on (step S11). In response to the power-on, the login request unit 13 of the terminal 10aa transmits login request information representing a login request from the transmission/reception unit 11 to the management server 40 via the communication network 2 (step S12). Login request information may be transmitted in response to an input of an instruction from a user of a terminal 10.

The login request information contains the terminal ID of the terminal 10aa that is a requesting terminal and a password. The terminal ID and the password are read by the store/read processing unit 18 from the storage unit 1000. The terminal ID and the password may be information read from an external recording medium, such as a subscriber identity module card (SIM card), connected to the terminal 10. When the login request information transmitted from the terminal 10aa is received by the management server 40, the management server 40 can know the IP address of the terminal 10aa that is the transmitting terminal.

The terminal authentication unit 42 of the management server 40 performs terminal authentication by searching the terminal authentication management DB 4100 of the storage unit 4000, using, as search keys, the terminal ID and the password contained in the login request information received via the transmission/reception unit 41, and by determining whether the same terminal ID and password as the search keys are managed in the terminal authentication management DB 4100 (step S13).

When the terminal authentication unit 42 determines that the same terminal ID and password as the search keys are not managed, i.e., determines that it is not a login request from the terminal 10 with valid use authority, the transmission/reception unit 41 transmits authentication result information representing the authentication result obtained by the terminal authentication unit 42 to the login-requesting terminal 10aa via the communication network 2 and the preliminary operations end.

On the other hand, when the terminal authentication unit 42 determines that the same terminal ID and password as the search keys are managed, i.e., determines that it is a login request from the terminal 10 with valid use authority, the status management unit 43 stores the terminal ID of the terminal 10aa, the operation status, the date at which the login request information was received, and the IP address of the terminal 10aa in association with one another in the terminal management DB 4200 (step S14).

The transmission/reception unit 41 of the management server 40 transmits the authentication result information representing the authentication result obtained by the terminal authentication unit 42 to the login-requesting terminal 10aa via the communication network 2 (step S15).

The terminal extracting unit 44 of the management server 40 searches the destination list management DB 4300, using the terminal ID of the login-requesting terminal 10aa as a search key, and extracts the terminal IDs of destination terminal candidates corresponding to the terminal 10aa (step S16).

The terminal status acquisition unit 45 of the management server 40 acquires the operation status of each terminal 10 that is a destination terminal candidate by searching the terminal management DB 4200, using, as search keys, the terminal IDs of the destination terminal candidates extracted by the terminal extraction unit 44, and by reading, per terminal ID extracted by the terminal extraction unit 44, the operation status of "Off-line", "On-line (transmission possible)", or "On-line (transmitting)" (step S17).

The transmission/reception unit 41 of the management server 40 transmits destination state information containing the terminal IDs used as the search keys at step S17 and their corresponding operation statuses each being "Off-line", "On-line (transmission possible)", or "On-line (transmitting)" to the terminal 10aa via the communication network 2 (step S18). This allows the terminal 10aa to know the current operation status of each terminal 10 that is a destination terminal candidate, the operation status being "Off-line", "On-line (transmission possible)", or "On-line (transmitting)".

The terminal extraction unit 44 of the management server 40 searches the destination list management DB 4300, using the terminal ID of the login-requesting terminal 10aa as a search key, and extracts the terminal IDs of other terminals 10 for which the terminal ID of the terminal 10aa is registered as a destination terminal candidate (step S19).

The status management unit 43 of the management server 40 searches the terminal management DB 4200, using the terminal ID of the login-requesting terminal 10aa as a search key, and acquires the operation status of the login-requesting terminal 10aa being "On-line (transmission possible)" (step S20).

The transmission/reception unit 41 of the management server 40 transmits destination status information containing the terminal ID and the operation status of the terminal 10aa being "On-line (transmission possible)" acquired at step S20 to the terminals whose operation statuses are each "On-line" (the terminals 10ba and 10db here) in the terminal management DB 4200 from among the terminals 10 that are identified by the terminal IDs extracted at step S19 (step S21-1 and step S21-2). When the destination status information is transmitted to the terminals 10ba and 10db, the transmission/reception unit 41 refers to the IP addresses of the terminals managed in the terminal management table shown in FIG. 10 according to the terminal IDs of the terminals 10ba and 10db.

The above-described preliminary operations make it possible to transmit the terminal ID and the operation status of the login-requesting terminal 10aa being "On-line (transmission possible)" to the terminals 10ba and 10db that can transmit/receive data to/from the login-requesting terminal 10aa. Furthermore, when step S18 of the preliminary operations completes, the display control unit 16 of the terminal 10aa, for example, highlights information on the terminals participating in the television conference, i.e., the terminals whose operation statuses are each "On-line (transmitting)" or "On-line (transmission possible)", on the display 20 from among the information of the destination list displayed on the display 20, which allows the user to know terminals 10 participating in the television conference or terminals 10 that can participate in the television conference.

Figure 14:
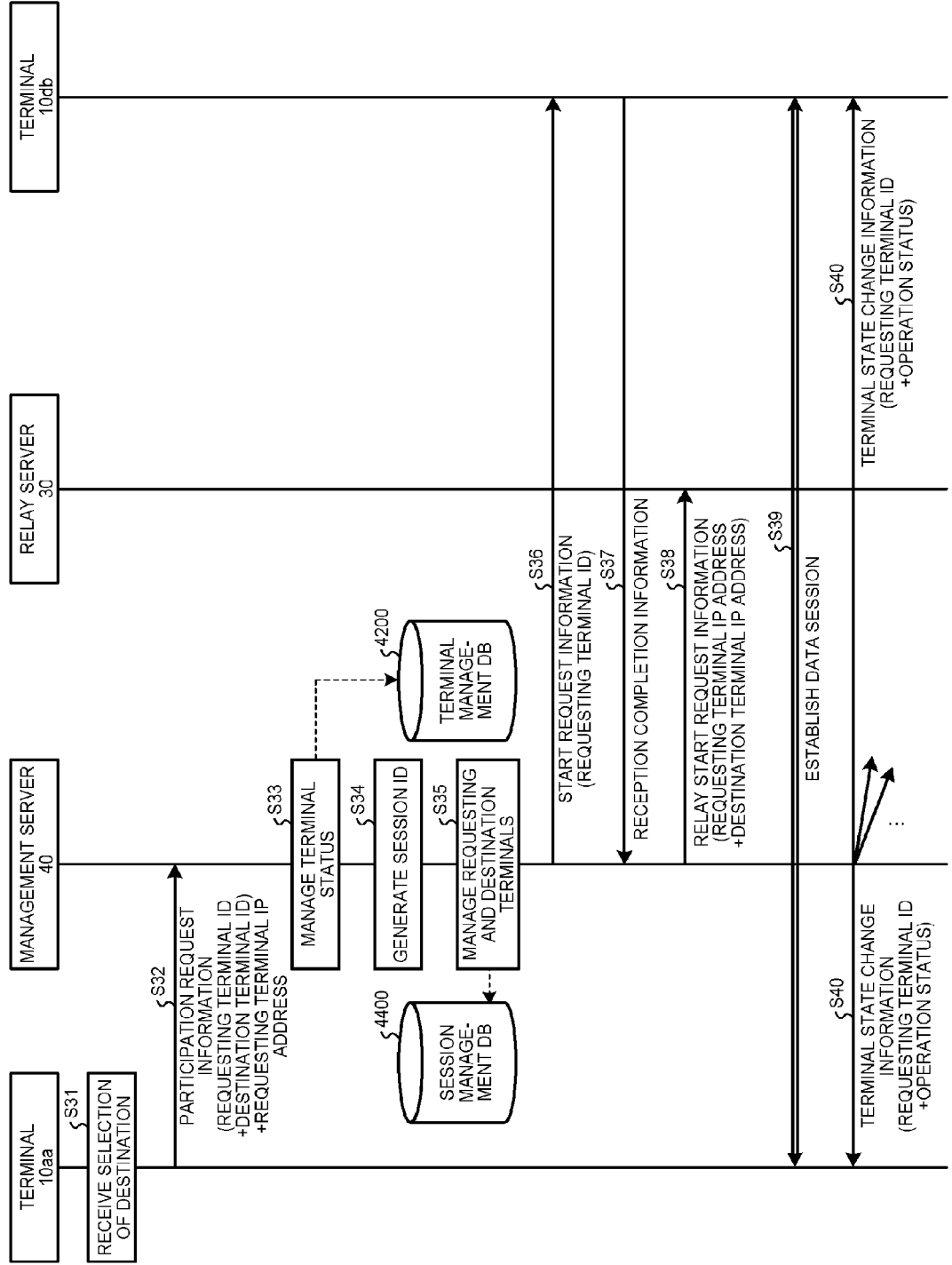
FIG. 14 is a sequence chart illustrating exemplary conference participation operations.

FIG. 14 is a sequence chart illustrating exemplary conference participation operations until when a terminal 10 enters a participating state of participating in a television conference. FIG. 14 illustrates an example where the terminal 10aa participates in a television conference with the terminal 10db. In the conference participation operations, various types of information are transmitted and received in the management information session Sei between the terminals 10aa and 10db and the management server 40.

When the user of the terminal 10aa operates the operation button 108 to choose to participate in a television conference, the operation input reception unit 12 of the terminal 10aa receives a request for participating in a television conference with the terminal 10db (step S31). In response to the request, the transmission/reception unit 11 of the terminal 10aa transmits, to the management server 40, participation request information that contains the terminal ID of the terminal 10aa and the terminal ID of the terminal 10db and represents that the terminal 10aa is to participate in the television conference (step S32). Accordingly, the transmission/reception unit 41 of the management server 40 receives the participation request information and can check the IP address of the request-transmitting terminal 10aa.

The status management unit 43 of the management server 40 searches the terminal management DB 4200, using, as a search key, the terminal ID of the terminal 10aa contained in the participation request information, and sets the operation status of the participation-requesting terminal 10aa to "On-line (transmitting)" (step S33).

The session management unit 46 of the management server 40 generates a session ID for identifying the data session Sed for transmitting/receiving data between the terminal 10aa and the terminal 10db (step S34). The session management unit 46 stores, in the session management DB 4400, the session ID generated at step S34, the relay server ID of the relay server 30 that is used, the terminal IDs of the terminals 10aa and 10db, and the data ID for identifying the data that is transmitted and received (step S35).

The transmission/reception unit 41 of the management server 40 transmits start request information containing the terminal ID of the terminal 10aa to the terminal 10db via the communication network 2 (step S36). Accordingly, the terminal 10db can know which terminal 10 has issued a request to participate in the television conference. The terminal 10db that has received the start request information from the management server 40 transmits reception completion information representing that reception of the start request information has completed to the management server 40 from the transmission/reception unit 11 via the communication network 2 (step S37).

The transmission/reception unit 41 of the management server 40 transmits relay start request information representing a request for starting data relay to the relay server 30 via the communication network 2 (step S38). The relay start request information contains the IP addresses of the terminal 10aa and the terminal 10db. Upon receiving the relay start request information, the relay server 30 establishes a data session Sed for transmitting and receiving data between the terminal 10aa and the terminal 10db (step S39). Accordingly, the terminal 10aa can participate in the television conference with the terminal 10db.

The transmission/reception unit 41 of the management server 40 broadcasts terminal status change information containing the terminal ID and the operation status of the terminal 10aa being "On-line (transmitting)" to each terminal 10 registered in the terminal management DB 4200 (step S40). Accordingly, each terminal 10 that has received the terminal status change information can store and display the operation status of the terminal 10aa as necessary.

Figure 15:
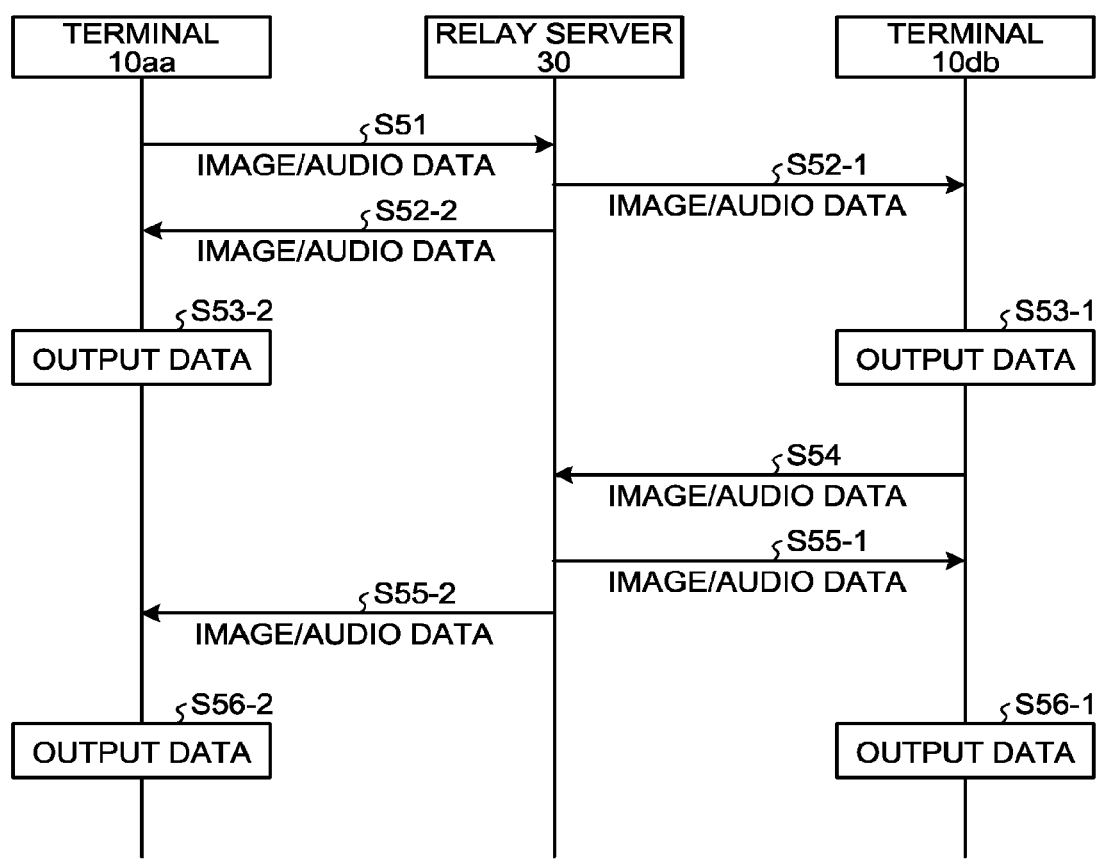
FIG. 15 is a sequence chart illustrating exemplary data transmission/reception operations between terminals.

FIG. 15 is a sequence chart illustrating exemplary data transmission/reception operations between terminals 10. FIG. 15 illustrates an example where data is transmitted between the terminal 10aa and the terminal 10db. In the data transmission and reception operations, image data or audio data is transmitted and received in the data session Sed between the terminal 10aa and the terminal 10db.

As described using FIG. 14, once the data session Sed is established between the terminal 10aa and the terminal 10db, the transmission/reception unit 11 of the terminal 10aa transmits image data input to the image input unit 14 and audio data input to the audio input unit 15 to the relay server 30 via the communication network 2 (step S51).

The relay server 30 that has received the image data and audio data from the terminal 10aa transmits the received image data and audio data to each terminal (the terminals 10aa and 10db here) participating in the television conference (step S52-1 and step S52-2).

Each of the terminals 10*aa* and 10*db* that have received the image data and audio data from the relay server 30 causes the display control unit 16 to display the image represented by the received image data on the display 20 and causes the audio output unit 17 to output the sound represented by the received audio data to reproduce the sound from the speaker 115 (step S53-1 and step S53-2). Each time the time management unit 16*a* of the display control unit 16 performs processing for displaying the image data on the display 20, the time management unit 16*a* performs processing of writing the time as the last output time in the output state management table of the above-described output state management DB 1100 (see FIG. 5). Each time the time management unit 17*a* of the audio output unit 17 performs processing of outputting the audio data to reproduce the audio data from the speaker 115, the time management unit 17*a* performs processing of writing the time as the last output time in the output state management table.

The transmission/reception unit 11 of the terminal 10*db* then transmits the image data that has been input to the image input unit 14 and audio data that has been input to the audio input unit 15 to the relay server 30 via the communication network 2 (step S54).

The relay server 30 that has received the image data and audio data from the terminal 10*db* transmits the received image data and audio data to each terminal (the terminals 10*aa* and 10*db* here) participating in the television conference (step S55-1 and step S55-2).

Each of the terminals 10*aa* and 10*db* that have received the image data and audio data from the relay server 30 causes the display control unit 16 to display the image represented by the received image data on the display 20 and causes the audio output unit 17 to output the sound represented by the received audio data to reproduce the sound from the speaker 115 (step S56-1 and step S56-2). Each time the processing for displaying image data on the display 20 is performed, the time management unit 16*a* of the display control unit 16 performs write processing of writing the time as the last output time in the output state management table of the above-described output state management DB 1100 (see FIG. 5). Each time the processing for outputting the audio data to reproduce the audio data from the speaker 115 is performed, the time management unit 17*a* of the audio output unit 17 performs write processing of writing the time as the last output time in the output state management table.

As described above, the terminals 10*aa* and 10*db* can carry out the television conference by transmitting and receiving image data or audio data via the relay server 30. For simple descriptions, FIG. 15 assumes that there are two terminals 10*aa* and 10*db* as terminals 10 participating in the television conference; however, even when there are three or more terminals participating in the television conference, image data and audio data are transmitted and received among the terminals 10 in the same manner as that of the data transmission/reception operations illustrated in FIG. 15.

Figure 16:
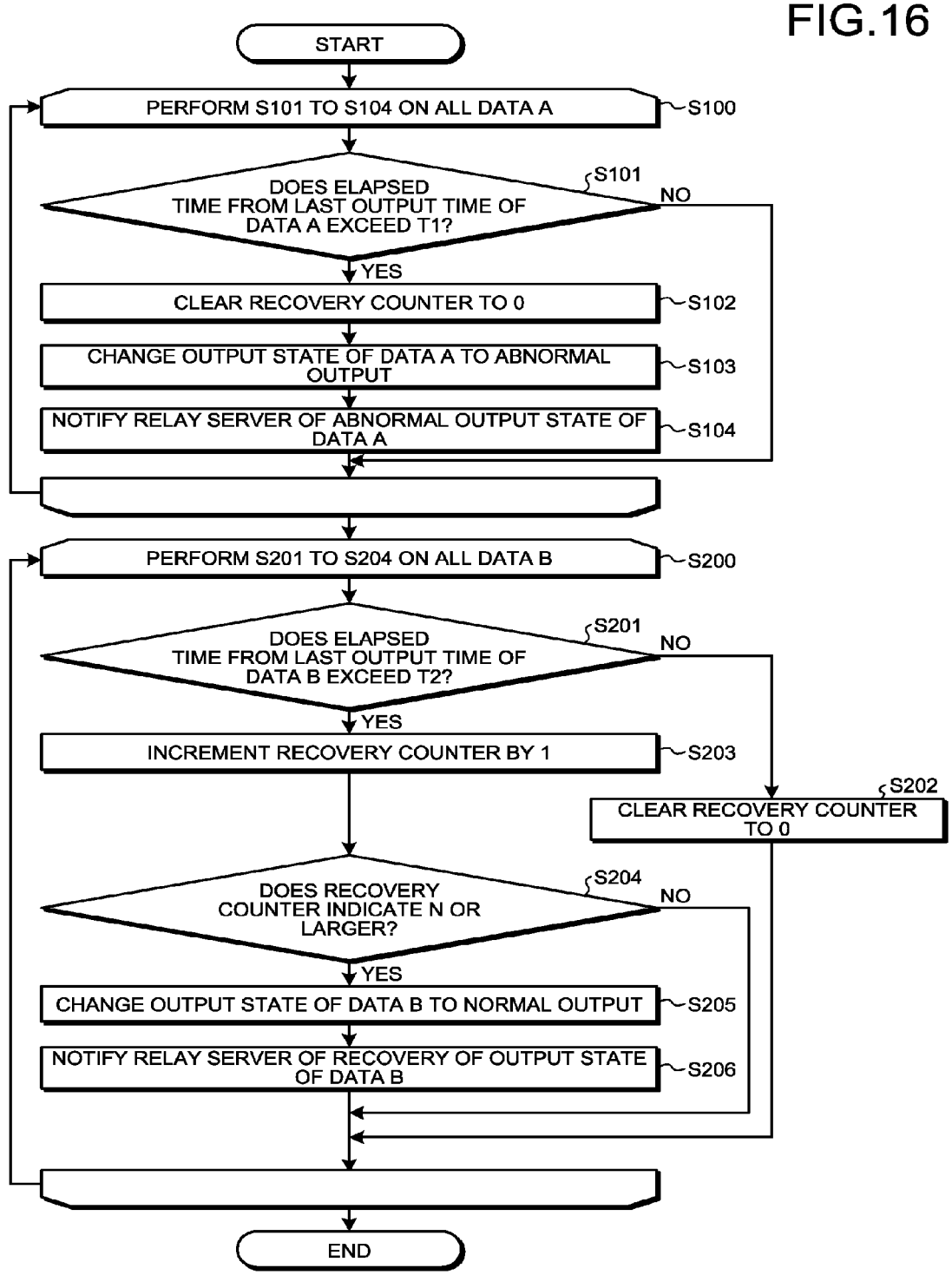
FIG. 16 is a flowchart illustrating an exemplary processing procedure performed by an output state determination unit and a notification unit.

A specific example of the processing performed by the output state determination unit 21 and the notification unit 22 of each of the terminals 10 will be described here with reference to FIG. 16. FIG. 16 is a flowchart illustrating an exemplary processing procedure performed by the output state determination unit and the notification unit 22.

Referring to the output state management table (see FIG. 5) of the above-described output state management DB 1100, the output state determination unit 21 determines the output state of each data that the terminal 10 is transmitting (data not in the output state of "output stopped") from among the image data and audio data shared in the television conference in which the terminal 10 is participating and updates the output state management table as required. The notification unit 22 issues a notification to the relay server 30 when the output state changes.

As shown in FIG. 16, the processing routine executed by the output state determination unit 21 and the notification unit 22 includes a first loop processing (step S100) and a second loop processing following the first loop processing (step S200). The output state determination unit 21 and the notification unit 22 repeatedly executes the routine consisting of these two types of loop processing at a given timing (e.g. at every 5-second interval).

In the first loop processing (step S100), the following steps S101 to S104 are performed on each data whose current output state is "normal output" (hereinafter, which is referred to as "data A") from among the data managed in the output state management table of the output state management DB 1100.

The output state determination unit 21 checks the last output time of the data A with reference to the output state management table and determines whether the elapsed time from that time until now exceeds a threshold T1 (step S101). When the elapsed time from the last output time does not exceed the threshold T1 (NO at step S101), the output state of the data A is still "normal output" and accordingly the process moves to the determination processing on the next data A (step S101).

On the other hand, when it is determined that the elapsed time from the last output time exceeds the threshold T1 at step S101 (YES at step S101), the output state determination unit 21 clears a recovery counter that is used to determine whether the output state has recovered, to 0 (step S102) and changes the output state of the data A in the output state management table from "normal output" to "abnormal output" (step S103). The notification unit 22 notifies the relay server 30 that the output state of the data A has entered "abnormal output" (step S104). The abnormal output notification contains the data ID of the data A whose output state has entered "abnormal output" and the IP address of the terminal 10.

Thereafter, when there is data A on which the first loop processing (step S100) has not been performed, the process returns to step S101 and the processing thereafter are repeated and, when the first loop processing (step S100) on all data A ends, the process moves to the second loop processing (step S200).

In the second loop processing (step S200), the processing at the following steps S201 to S206 is performed on each data whose current output state has entered "abnormal output" (hereinafter, which is referred to as "data B") from among the data managed in the output state management table of the output state management DB 1100.

First, the output state determination unit 21 checks the last output time of the data B with reference to the output state management table and determines whether the elapsed time from that time until now is smaller than a threshold T2 (step S201). The threshold T2 is preferably smaller than the threshold T1 used for the determination processing at step S101 and is a value with which it is securely determined that the data output state has recovered. When the elapsed time from the last output time is not smaller than the threshold T2 (NO at step S201), the output state determination unit 21 clears the recovery counter to 0 (step S202) and moves to determination processing on the next data B (step S201).

On the other hand, upon determining that the elapsed time from the last output time is smaller than the threshold T2 at step S201 (YES at step S201), the output state determination unit 21 increments the recovery counter by 1 (step S203) and then determines whether the value of the recovery counter is equal to or larger than a threshold N (step S204). When the value of the recovery counter is smaller than the threshold N (NO at step S204), there is a possibility that the recovery of the output state is temporary, and thus the process moves to the determination processing on the next data B (step S201).

On the other hand, upon determining that the value of the recovery counter is equal to or larger than the threshold N at step S204 (YES at step S204), the output state determination unit 21 changes the output state of the data B in the output state management table from "abnormal output" to "normal output" (step S205). The notification unit 22 notifies the relay server 30 that the output state of the data B has recovered from "abnormal output" to "normal output" (step S206). The abnormal output recovery notification contains the data ID of the data B whose output state has recovered to "normal output" and the IP address of the terminal 10.

If there is the data B on which the second loop processing (step S200) has not been performed, the process returns to step S201 to repeat the processing thereafter. When the second loop processing (step S200) on all data B ends, the series of processes shown in the flowchart in FIG. 16 ends.

Figure 17:
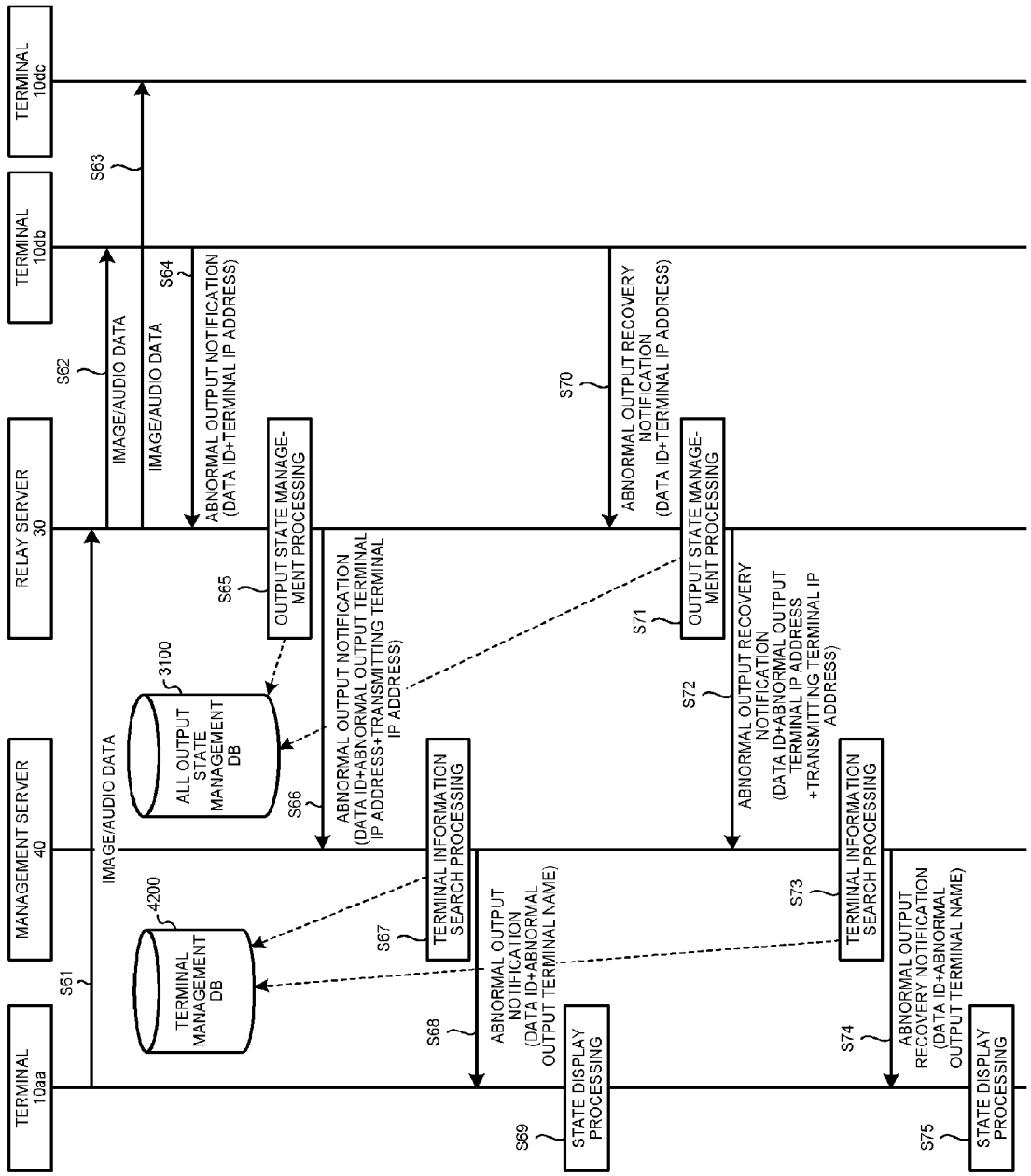
FIG. 17 is a sequence chart illustrating exemplary operations including abnormal output notification and abnormal output recovery notification.

Notification on the data output state and the accompanying operations of the terminal 10, the relay server 30, and the management server 40 will be described with reference to FIG. 17. FIG. 17 is a sequence chart illustrating exemplary operations including abnormal output notification and abnormal output recovery notification. FIG. 17 illustrates an example where an output state notification is issued regarding image data or audio data transmitted from the terminal 10aa to the terminal 10bd and a terminal 10dc via the relay server 30.

Image data or audio data from the terminal 10aa participating in the television conference is transmitted to the terminal 10bd and the terminal 10dc participating in the same television conference via the relay server 30 (steps S61 to S63). Although FIG. 17 does not illustrate, it is assumed that data is continuously transmitted from the terminal 10aa to the terminal 10bd and the terminal 10dc. The terminal 10bd and the terminal 10dc keeps determining (e.g., at every 5 seconds) the output state of the data from the terminal 10aa according to the flow shown in FIG. 16.

It is assumed that the terminal 10db detects that the output state of the data transmitted from the terminal 10aa is "abnormal output". In this case, the terminal 10db transmits, to the relay server 30, an abnormal output notification containing the data ID of the data that is determined as "abnormal output" and the IP address of the terminal 10db (step S64).

Upon receiving the abnormal output notification from the terminal 10db, the relay server 30 updates the all output state management table of the all output state management DB 3100 (step S65). Specifically, the relay server 30 adds the IP address of the terminal (the terminal 10db here) that has detected "abnormal output" to the field of "abnormal output terminal" corresponding to the data ID of the data in the state of "abnormal output" in the all output state management table.

The relay server 30 transmits, to the management server 40, an abnormal output notification containing the data ID of the data in the abnormal output state, the IP address of the terminal (the terminal 10db here) that has detected "abnormal output", and the IP address of the terminal (the terminal 10aa here) from which the data in the state of "abnormal output" is transmitted (step S66).

Upon receiving the abnormal output notification from the relay server 30, the management server 40 searches the terminal management DB 4200, using, as a search key, the IP address of the terminal (the terminal 10db here) that has detected "abnormal output", and acquires the terminal name of the terminal 10db (step S67). The management server 40 then transmits, to the data transmitting terminal (the terminal 10aa here), an abnormal output notification containing the data ID of the data in the state of "abnormal output" and the terminal name of the terminal (the terminal 10db here) that has detected "abnormal output" (step S68). Accordingly, the terminal 10aa can know which data that the terminal 10aa is transmitting is in the state of "abnormal output" and at which terminal it has occurred.

Figure 18A:
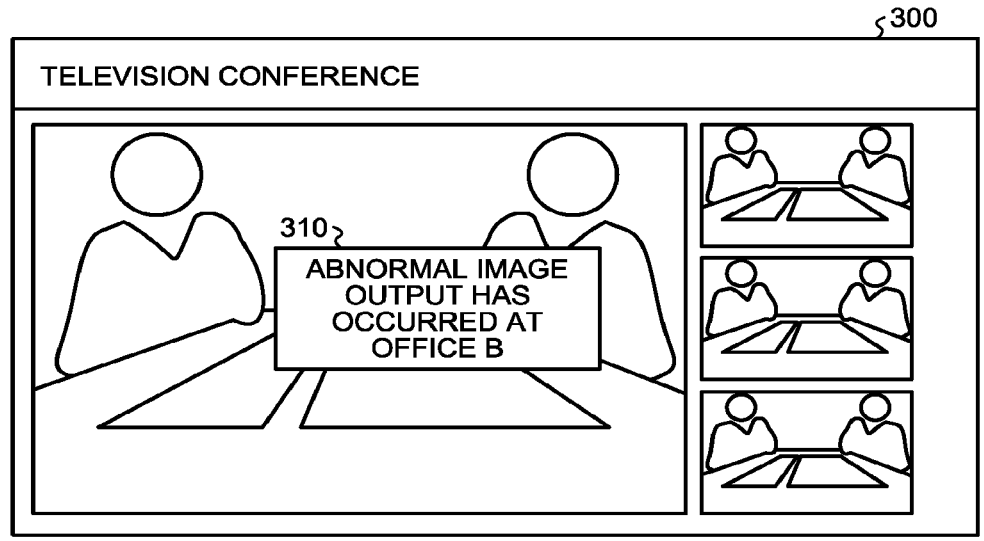
FIGS. 18A and 18B are diagrams showing exemplary displays of output state information.

At the terminal 10aa having received the abnormal output notification from the management server 40, the state display processing unit 23 performs processing of displaying output state information on the display 20 according to the abnormal output notification from the management server 40 (step S69). For example, according to the abnormal output notification from the management server 40, the state display processing unit 23 generates output state information representing that the image data is in the state of "abnormal output" at the terminal 10db (here, the terminal name is Office B). The state display processing unit 23 passes the generated output state information to the display control unit 16 and issues an output state information display request to display, for example, as shown in FIG. 18A, output state information 310 consisting of a message saying "Abnormal image output has occurred at Office B" as a pop-up screen on a television conference screen 300 on the display 20.

It is assumed that the terminal 10db then detects that the output state of the data transmitted from the terminal 10aa has recovered from "abnormal output" to "normal output". In this case, the terminal 10db transmits, to the relay server 30, an abnormal output recovery notification containing the ID of the data whose output state has recovered and the IP address of the terminal 10db (step S70).

Upon receiving the abnormal output recovery notification from the terminal 10db, the relay server 30 updates the all output state management table of the all output state management DB 3100 according to the abnormal output recovery notification (step S71). Specifically, the relay server 30 deletes the IP address of the terminal (the terminal 10db) that has detected the recovery of the output state, from the field of "abnormal output terminal" corresponding to the data ID of the data whose output state has recovered in the all output state management table.

The relay server 30 then transmits, to the management server 40, an abnormal output recovery notification containing the data ID of the data whose output state has recovered, the IP address of the terminal (the terminal 10db here) that has detected the recovery of the output state, and the IP address of the terminal (the terminal 10aa here) from which the data whose output state has recovered is transmitted (step S72).

Upon receiving the abnormal output recovery notification from the relay server 30, the management server 40 searches the terminal management DB 4200, using, as a search key, the IP address of the terminal (the terminal 10db) having detected the recovery of the output state, and acquires the terminal name of the terminal 10db (step S73). The management server 40 then transmits, to the data-transmitting terminal (the terminal 10aa here), an abnormal output recovery notification containing the data ID of the data whose output state has recovered and the terminal name of the terminal (the terminal 10db) that has detected the recovery of the output state (step S74). Accordingly, the terminal 10*aa* can know which data the terminal 10*aa* is transmitting has recovered in its output state and at which terminal it has occurred.

Figure 18B:
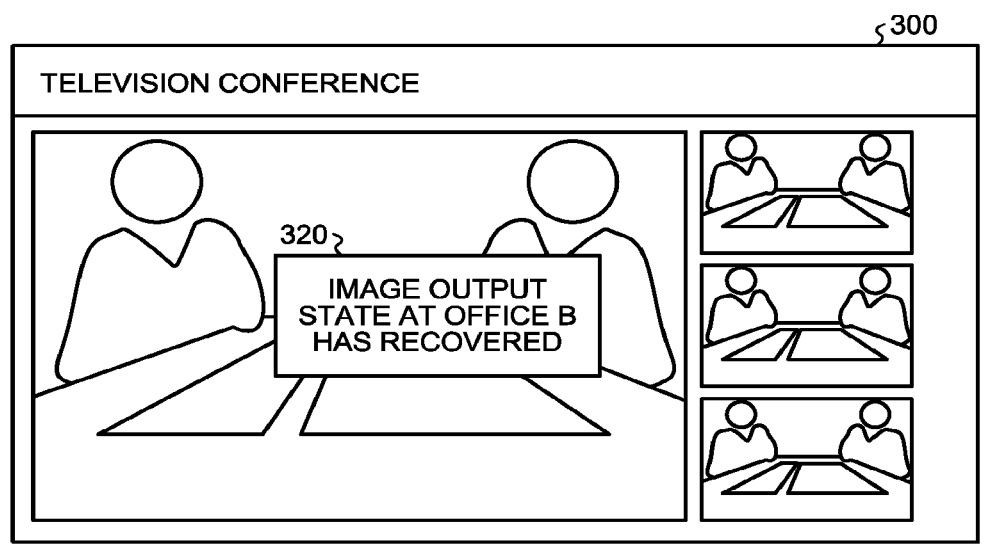

According to the abnormal output recovery notification from the management server 40, the terminal 10*aa* that has received the abnormal output recovery notification from the management server 40 performs processing for displaying output state information on the display 20 (step S75). For example, according to the abnormal output recovery notification from the management server 40, the state display processing unit 23 generates output state information representing that the image data that was in the state of "abnormal output" at the terminal 10*db* (the display name is Office B here) has recovered to a state of "normal output". The state display processing unit 23 passes the generated output state information to the display control unit 16 and issues an output state information display request to display, for example, as shown in FIG. 18B, output state information 320 consisting of a message saying "Image output state at Office B has recovered" as a pop-up screen on the television conference screen 300 on the display 20.

In the example shown in the sequence chart in FIG. 17, the terminal 10*aa* that performs the output state information display processing receives, from the management server 40, the abnormal output notification containing the terminal name of the terminal 10*db* that has detected "abnormal output" and the abnormal output recovery notification containing the terminal name of the terminal 10*db* that has detected the recovery of the output state; however, in a case where a terminal 10 that performs the output state information display processing stores a correspondence relation between the terminal IDs and terminal names of other terminals participating in a television conference, the terminal 10 may be configured to receive, from the management server 40, an abnormal output notification and abnormal output recovery information each containing a terminal ID instead of a terminal name.

In the example shown in the sequence chart of FIG. 17, by transmitting the abnormal output notification and the abnormal output recovery notification from the relay server 30 to the terminal 10 via the management server 40, the IP addresses of the terminal 10 that has detected "abnormal output" and the terminal 10 that has detected the recovery of the output state are converted into the display names and the terminal 10 that performs the output state information display processing is notified of the display names; however, in a case where the terminal 10 at which "abnormal output" occurred and the output state has recovered is not particularly specified and output state information representing only that "abnormal output" occurred and the output state has recovered at any one terminal 10 is displayed, a configuration may be employed where an abnormal output notification and an abnormal output recovery notification from the relay server 30 are directly transmitted to the terminal 10 not via the management server 40.

Also in a case where at least any one of the relay server 30 and the terminal 10 stores a correspondence relation between the IP addresses and terminal names of terminals 10 participating in the television conference, a configuration may be employed where the abnormal output notification and the output abnormality recovery notification are transmitted directly to the terminal 10 not via the management server 40.

Operations of a terminal 10 for displaying, as output state information, a list of the output states of respective data that the terminal 10 is transmitting to other terminals 10, on the display 20 will be described here with reference to FIG. 19. FIG. 19 is a sequence chart of exemplary operations of acquiring and displaying an output state list. FIG. 19 illustrates an example where the terminal 10*aa* acquires a list of output states of respective data the terminal 10*aa* transmits to other terminals 10.

First, when the user of the terminal 10*aa* performs an operation of requesting an output state list using, for example, the operation button 108, the terminal 10*aa* transmits an output state list request containing the IP address of the terminal 10*aa* to the relay server 30 (step S81).

Upon receiving the output state list request from the terminal 10*aa*, the relay server 30 refers to the all output state management table of the all output state management DB 3100 and generates a list of IP addresses of terminals 10 that have detected "abnormal output" about each data the requesting terminal 10*aa* is transmitting to other terminals 10 (step S82). Specifically, according to the all output state management table, the relay server 30 check whether there is any IP address stored in the field of "abnormal output terminal" corresponding to the data IDs of data that the requesting terminal 10*aa* is transmitting to other terminals 10. When there is an IP address stored in the field of "abnormal output terminal", a combination of the IP address and the data ID is extracted. This processing is repeated for all data that the requesting terminal 10 is transmitting to other terminals 10 and a list of combinations of data ID and IP address is generated.

The relay server 30 transmits an output state list notification containing the IP address of the requesting terminal 10*aa* and the generated list to the management server 40 (step S83).

Upon receiving the output state list notification, the management server 40 performs processing of searching the session management DB 4400 and the terminal management DB 4200 (step S84). Specifically, the management server 40 refers to the session management table of the session management DB 4400 and generates a list that is the list of terminal names of other terminals 10 participating in the same television conference as that in which the terminal 10*aa* requesting the output state list is participating. The management server 40 further refers to the terminal management table of the terminal management DB 4200, acquires the terminal names corresponding to the IP addresses of the terminals 10 that have detected "output abnormality", and generates a list consisting of combinations of the data IDs of data in the abnormal output state and the terminal names of the terminals 10 at which the output abnormality has occurred.

The management server 40 transmits, to the requesting terminal 10*aa*, an output state list notification containing the list of the terminal names of other terminals 10 participating in the same television conference as that in which the requesting terminal 10*aa* is participating and the list of combinations of the data IDs of data in the "abnormal output" state and the terminal names of the terminals 10 that have detected "abnormal output" (step S85).

In the terminal 10*aa* having received the output state list notification from the management server 40, according to the output state list notification from the management server 40, the state display processing unit 23 performs processing of displaying output state information representing the list of output states on the display 20 (step S86). For example, according to the output state list notification from the management server 40, the state display processing unit 23 generates screen information of the participating base list screen. The state display processing unit 23 passes the generated screen information to the display control unit 16 and issues an output state information display request to display, for example, as shown in FIG. 20, the list of bases participating in the television conference and a participating base list screen 400 representing output states in which image data and audio data from the terminal 10*aa* is, on the display 20.

In the example shown in the sequence chart of FIG. 19, the terminal 10*aa* issues an output state list request to the relay server 30 (step S81). Alternatively, the terminal 10*aa* may issue an output state list request to the management server 40. In this case, the terminal 10*aa* transmits, for example, an output state list request containing the terminal ID of the terminal 10*aa* to the management server 40. The management server 40 identifies the IP address of the terminal 10*aa* according to the terminal ID of the terminal 10*aa* and transmits an output state list request containing the IP address to the relay server 30. The steps thereafter are the same as those of the example illustrated in the sequence chart of FIG. 19.

In the example illustrated in the sequence chart of FIG. 19, the terminal 10*aa* that performs output state information display processing receives, from the management server 40, the output state list notification containing the terminal names of other terminals 10 participating in the same television conference and the terminal names of the terminals 10 that have detected "abnormal output". In a case where a terminal 10 that performs output state information display processing stores a correspondence relation between IDs and terminal names of other terminals participating in a television conference, the terminal 10 may be configured to receive an output state list notification containing the terminal IDs instead of the terminal names from the management server 40.

In the example illustrated in the sequence chart of FIG. 19, by transmitting the output state list notification from the relay server 30 to the terminal 10 via the management server 40, the IP addresses of the terminal 10 participating in the television conference are converted into display names and the terminal 10 that performs the output state information display processing is notified of the display names; however, in a case where at least any one of the relay server 30 and the terminal 10 stores the correspondence relation between the IP addresses and the terminal names of the terminals 10 participating in the television conference, a configuration may be employed in which the output state list notification from the relay server 30 is directly transmitted to the terminal 10 not via the management server 40.

As described in detail using specific examples, in the television conference system 1 according to the embodiment, each terminal 10 participating in the television conference determines the data output state received from other terminals 10 and notifies the relay server 30 of the result. Each terminal 10 participating in the television conference acquires the output state of data that the terminal 10 has transmitted to other terminals 10 at the other terminals 10 from the relay server 30 via the management server 40 and displays the output state information representing the acquired output states on the display 20. Accordingly, according to the television conference system 1, each terminal 10 participating in the television conference can easily know the output states of data that the terminal 10 has transmitted to the other terminals 10 at the other terminals 10.

The present invention is not limited to only the above-described embodiments. When embodied, the invention may be embodied by adding various modifications and changes within the scope of the invention. In other words, the specific configurations and operations of the television conference system 1, the terminals 10, the relay server 30, the management server 40, and the like are examples only and various modifications may be made according to the intended use and purpose.

For example, the relay server, the management server 40, and the program provision server 50 according to the above-described embodiment may be constructed by using a single computer or may be constructed by using multiple computers allocated arbitrarily to divided functions of servers. Alternatively, a part of or all functions of the servers may be combined arbitrarily to construct a server device or a system in a frame different from that of the above-described embodiment. For example, the functions of the relay server 30 and the functions of the management server 40 may be integrated to construct a single server device.

According to the above-described embodiment, the television conference system 1 is exemplified as an exemplary communication system to which the invention is applied; however, the invention is not limited to this. The invention can be effectively applied to, for example, various communication systems, such as a telecommunication system, such as, Internet protocol (IP) phone in which audio data is interactively transmitted and received between terminals and a car navigation system that distribute map data and route information to car navigation devices mounted on vehicles from a terminal of a management center.

The above-described embodiment exemplifies the television conference terminal (terminal) 10 as an exemplary communication device to which the present invention is applied; however, the invention is not limited to this. The present invention is effectively applicable to various communication devices, such as a PC, a tablet terminal, a smartphone, an electric board, and a car navigation system mounted on a vehicle.

It is possible to understand the above-described embodiment as follows: a terminal 10 according to the embodiment is a terminal 10 that outputs data received from another terminal 10, the terminal 10 including: the notification unit 22 that notifies the external relay server 30 of an output state of data received from the other terminal 10; and the state display processing unit 23 that, while a session for receiving data with the other terminal 10 is established, acquires an output state of data transmitted to the other terminal 10 at the other terminal 10 from the relay server 30 via the management server 40 and displays output state information representing the acquired output state on the display 20.

The television conference system 1 according to the embodiment includes a plurality of terminals 10 each of which outputs data received from another terminal 10, the relay server 30, and the management server 40, wherein each of the terminals 10 includes: the notification unit 22 that notifies the relay server 30 of the output state of the data received from the other terminal 10; and the state display processing unit 23 that, while a session for receiving data with another terminal 10 is established, acquires an output state of data transmitted to the other terminal 10 at the other terminal 10 from the relay server 30 via the management server 40 and displays output state information representing the acquired output state on the display 20, wherein the relay server 30 includes: the output state management unit 33 that, according to output states of which the relay server 30 is notified by the terminals 10, manages the output states of all data transmitted and received among the terminals 10; and the transmission/reception unit 31 notifies the terminal 10 from which the data corresponding to an output state is transmitted, of the output state of which relay server 30 is notified by the terminal 10.

The relay server 30 and the management server 40 according to the embodiment construct a communication management system that manages transmission and reception of data among a plurality of terminals 10 each of which outputs data received from another terminal 10. Each of the terminals 10 among which transmission and reception of data is managed by the data communication management system includes: the notification unit 22 that issues a notification indicating an output state of data received from another terminal 10; and the state display processing unit 23 that, while a session for receiving data with another terminal is established, displays output state information representing an output state of data transmitted to the other terminal 10 at the other terminal 10 on the display 20. The communication system further includes: the output state management unit 33 that acquires output states indicated by notifications issued from the terminals 10 and manages the output states of all data transmitted and received among the terminals 10; and the transmission/reception unit 31, 41 that notifies a terminal 10 from which the data corresponding to an output state managed by the output state management unit 33 is transmitted, of the output state.

The communication control method according to the embodiment is a communication control method executed by the terminal 10 that outputs data received from another terminal 10, the method including: notifying the relay server 30 of an output state of data received from the other terminal 10; and, while a session for receiving data with another terminal 10 is established, acquiring an output state of data transmitted to the other terminal 10 at the other terminal 10 from the relay server 30 via the management server 40 and displaying output state information representing the acquired output state on the display 20.

The terminal program according to the embodiment causes the output terminal 10 that outputs data received from another terminal 10 to implement functions comprising: notifying the relay server 30 of an output state of data received from the other terminal 10; and, while a session for receiving data with the other terminal 10 is established, acquiring an output state of data transmitted to the other terminal 10 at the other terminal 10 from the relay server 30 via the management server 40 and displaying output state information representing the acquired output state on the display 20.

An embodiment has an advantage in that it is possible to easily know the output state on data transmitted to another communication apparatus at the other communication apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

REFERENCE SIGNS LIST

1 Television conference system
2 Communication network
10 Terminal
11 Transmission/reception unit
16 Display control unit
16a Time management unit
17 Audio output unit
17a Time management unit
20 Display
22 Notification unit
23 State display processing unit
30 Relay server
31 Transmission/reception unit
33 Output state management unit
40 Management server
41 Transmission/reception unit
46 Session management unit
1100 Output state management DB
3100 All output state management DB
4400 Session management DB

What is claimed is:

1. A communication apparatus that outputs data received from another communication apparatus, the communication apparatus comprising:
   notification processing circuitry that notifies an external information processing apparatus of an output state of data received from the other communication apparatus;
   display processing circuitry that, while a session for receiving data with the other communication apparatus is established, acquires an output state of data transmitted to the other communication apparatus at the other communication apparatus from the information processing apparatus and displays output state information representing the acquired output state on a display device;
   a memory that stores last output time at which data received from the other communication apparatus was output last time; and
   determination processing circuitry that determines an output state of data received from the other communication apparatus,
   wherein the determination processing circuitry determines that the data is in an abnormal output state when elapsed time from last output time exceeds a first threshold, and
   wherein the notification processing circuitry notifies the information processing apparatus that the data is in the abnormal output state.

2. The communication apparatus according to claim 1, wherein the display processing circuitry displays the output state information in which the acquired output state is associated with an identification name of the other communication terminal corresponding to the output state.

3. The communication apparatus according to claim 1, wherein, when an output state of data transmitted to the other communication apparatus changes at the other communication apparatus, the display processing circuitry acquires the changed output state from the information processing apparatus and displays the output state information on the display device.

4. The communication apparatus according to claim 1, wherein:
   there are a plurality of other communication apparatuses to which data is transmitted, and
   the display processing circuitry acquires a list of output states of data transmitted to the other communication apparatuses at the respective other communication apparatuses from the information processing apparatus and displays, on the display device, the output state information in which the output states contained in the acquired list are associated with identification names of the respective other communication apparatuses.

5. The communication apparatus according to claim 4, wherein:

the display processing circuitry issues a request for acquiring the list to the information processing apparatus and acquires the list that is transmitted from the information processing apparatus in response to the request.

6. The communication apparatus according to claim 1, wherein:
the determination processing circuitry determines that data has recovered from the abnormal output state when elapsed time from last output time of the data determined as being in the abnormal output state is smaller than a second threshold smaller than the first threshold, and
the notification processing circuitry notifies the information processing apparatus that the data has recovered from the abnormal output state.

7. The communication apparatus according to claim 6, wherein:
the determination processing circuitry determines that data has recovered from the abnormal output state when a state where elapsed time from last output time of the data determined as being in the abnormality output state is smaller than the second threshold is repeatedly detected for a predetermined number of times, and
the notification processing circuitry notifies the information processing apparatus that the data has recovered from the abnormal output state.

8. The communication apparatus according to claim 1, wherein
the information processing apparatus includes:
relay processing circuitry that relays data that is transmitted and received between a plurality of communication apparatuses; and
management processing circuitry that manages transmission and reception of data between the plurality of communication apparatuses,
the notification processing circuitry notifies the relay processing circuitry of an output state of data received from the other communication apparatus, and
the display processing circuitry acquires an output state at the other communication device from the relay processing circuitry via the management device.

9. A communication system comprising:
a plurality of communication apparatuses that output data received from another communication apparatus; and
an information processing apparatus,
each of the communication apparatuses comprising:
notification processing circuitry that notifies the information processing apparatus of an output state of data received from another communication apparatus;
display processing circuitry that, while a session for receiving data with another communication apparatus is established, acquires an output state of data transmitted to the other communication apparatus at the other communication apparatus from the information processing apparatus and displays output state information representing the acquired output state on a display device;
a memory that stores last output time at which data received from the other communication apparatus was output last time; and
determination processing circuitry that determines an output state of data received from the other communication apparatus,
wherein the determination processing circuitry determines that the data is in an abnormal output state when elapsed time from last output time exceeds a first threshold, and
wherein the notification processing circuitry notifies the information processing apparatus that the data is in the abnormal output state, and
the information processing apparatus comprising:
management processing circuitry that, according to output states of which the information processing apparatus is notified by the communication apparatuses, manages output states of all data transmitted and received between the communication apparatuses; and
notification processing circuitry that notifies a communication apparatus from which data corresponding to an output state is transmitted, of the output state of which the information processing apparatus is notified by the communication apparatus.

10. A communication management system that manages transmission and reception of data between a plurality of communication apparatuses each of which outputs data received from another terminal,
each of the communication apparatuses including:
notification processing circuitry that issues a notification indicating an output state of data received from another communication apparatus; and
display processing circuitry that, while a session for receiving data with another communication apparatus is established, displays, on a display device, output state information representing an output state of data transmitted to the other communication apparatus at the other communication apparatus;
a memory that stores last output time at which data received from the other communication apparatus was output last time; and
determination processing circuitry that determines an output state of data received from the other communication apparatus,
wherein the determination processing circuitry determines that the data is in an abnormal output state when elapsed time from last output time exceeds a first threshold, and
wherein the notification processing circuitry notifies the information processing apparatus that the data is in the abnormal output state,
the communication management system comprising:
management processing circuitry that acquires output states indicated by notifications issued from the communication apparatuses and manages the output states of all data transmitted and received between the communication apparatuses; and
notification that notifies a communication apparatus from which data corresponding to an output state managed by the management processing circuitry is transmitted, of the output state.

* * * * *